(12) United States Patent
Ichikawa et al.

(10) Patent No.: US 6,334,548 B1
(45) Date of Patent: Jan. 1, 2002

(54) PLASTIC CONTAINER FORMED BY INSERT-INJECTION PROCESS

(75) Inventors: Tooru Ichikawa, Misato; Yoshiji Moteki, Saitama-ken; Yoji Tanaka, Kawasaki, all of (JP)

(73) Assignee: Hosokawa Yoko Co., Ltd. (JP)

( * ) Notice: Subject to any disclaimer, the term of this patent is extended or adjusted under 35 U.S.C. 154(b) by 0 days.

(21) Appl. No.: 09/524,545

(22) Filed: Mar. 13, 2000

(30) Foreign Application Priority Data

Apr. 22, 1999 (JP) .................................................. P11-114611
Sep. 27, 1999 (JP) .................................................. P11-271840
Nov. 30, 1999 (JP) .................................................. P11-339914

(51) Int. Cl.$^7$ .................................................. B65D 35/08
(52) U.S. Cl. .................. 222/107; 220/613; 220/634; 220/680; 215/44
(58) Field of Search .................. 222/92, 107; 220/613, 220/634, 678, 680, 666; 215/43, 44

(56) References Cited

U.S. PATENT DOCUMENTS

| | | | | |
|---|---|---|---|---|
| 2,794,473 A | * | 6/1957 | Williams | 220/613 X |
| 2,853,209 A | * | 9/1958 | McArdle | 222/107 |
| 3,565,293 A | * | 2/1971 | Schultz | 222/107 |
| 3,734,393 A | * | 5/1973 | Stump | 222/573 X |
| 4,252,256 A | * | 2/1981 | Walsh | 222/211 |
| 4,527,699 A | * | 7/1985 | Namba et al. | 220/613 X |
| 5,058,801 A | * | 10/1991 | Frey et al. | 220/613 X |
| 5,873,970 A | | 2/1999 | Konuma et al. | |

FOREIGN PATENT DOCUMENTS

| | | |
|---|---|---|
| EP | 0 067 305 | 12/1982 |
| JP | 59-38038 | 3/1984 |

* cited by examiner

Primary Examiner—Kenneth Bomberg
(74) Attorney, Agent, or Firm—Parkhurst & Wendel, LLP

(57) ABSTRACT

A plastic container comprises a main body, a large-diameter member and a small-diameter-formed member. The main body is formed of a plastic laminate film into a tubular shape. The large-diameter-formed member is joined to the outer surface of the end of the main body by an insert-injection process. The small-diameter-formed member is jointed to the inner surface of the other end of the main body by the insert-injection process.

2 Claims, 21 Drawing Sheets

PLASTIC CONTAINER FORMED BY INSERT-INJECTION PROCESS

BACKGROUND OF THE INVENTION

1. Field of the Invention

The present invention includes the first to forth inventions. The first invention relates to a plastic container, which is suitable for receiving contents in the form of powder, particle or liquid, and a method for manufacturing such a plastic container. The second invention relates to a container for receiving fluid such as calking agent, sealant, adhesive, mayonnaise or the like. The third invention relates to a fluid discharging apparatus for squeezing a fluid dispensing cartridge formed of a film into a tubular shape from its one end to discharge fluid such as adhesive received in its inside from an opening end provided at the other end of the cartridge, and to an installation apparatus, which is to be used in combination with the above-mentioned fluid discharging apparatus. The fourth invention relates to a fluid discharging apparatus for squeezing a fluid dispensing cartridge formed of a flexible film to discharge fluid such as adhesive, calking agent or the like, which is received in the cartridge.

2. Description of the Related Art

With respect to the first invention, a container for receiving a solid such as ground coffee beans, the moisture of which should be decreased, is required to be formed of material through which moisture cannot pass. As such a kind of container, there is generally used a glass container, a metallic can or a plastic container obtained by a blow molding method.

The glass container or the metallic can are excellent in moisture-proof property and gas isolating property, and has a good storing property. They however have problems of weight and volume of the container itself, which may hinder a disposal of the used container.

The plastic container obtained by the blow molding method can solve the problems of weight and volume of the glass container and the metallic can. It is however impossible to decrease the thickness of the plastic container under 0.7 mm by the conventional blow molding method. Accordingly, with respect to the plastic container obtained by the blow molding method, only a co-extruded article of a barrier base material such as ethylene vinyl alcohol (EVOH) copolymer resins (i.e., "EVAL" (trademark)) and a synthetic resin material such as polyethylene, polypropylene or the like can provide appropriate moisture-proof property and gas isolating property.

In order to solve the above-mentioned problems of the plastic container, the applicant developed a method for manufacturing the plastic container, which comprises the steps of putting an intermediate tubular body formed of a plastic laminate film on a mandrel serving as a core for a mold; putting upper and lower local molds on the mandrel in which the intermediate tubular body has already been put; injecting synthetic resin material in a molten state into the upper and lower local molds by the insert-injection process so as to form upper and lower formed members integrally with the outer surface of the intermediate tubular body.

The plastic container 1 obtained by the above-described method for manufacturing the plastic container comprises the intermediate tubular body 2, the upper formed member 3 integrally connected to the outer surface of the upper end portion of the intermediate tubular body 2, the lower formed member 4 integrally connected to the outer surface of the lower end portion of the intermediate tubular body 2 and a cover member 5 for closing the opening end of the upper formed member 3, as shown in FIG. 6.

The intermediate tubular body of the plastic container is formed of the plastic laminate film so that a multicolor printing can be applied on the outer surface of the intermediate tubular body. However, the upper and lower formed members formed on the outer surface of the intermediate tubular body decrease the effective area on which the printing is to be applied.

When the above-described method for manufacturing the plastic container is carried out under the conditions that the lower formed member is provided with a bottom and the lower edge of the intermediate tubular body comes into contact with such a lower formed member, wrinkles may occur at the end of the intermediate tubular body or the end thereof may be turned up due to the injection pressure of the synthetic resin material in the molten state during the insert injection forming, thus leading to substandard articles.

With respect to the second invention, the container for receiving fluid such as calking agent, sealant, adhesive, mayonnaise or the like generally comprises a main body formed into a tubular shape having opposite opening ends and two bottom members (i.e., closing devices) for closing the opposite opening ends of the main body, respectively. The container can receive the fluid such as adhesive in its inside. The main body is formed of a laminate comprising a plurality of films in order to ensure strength and to prevent surely an air ventilation between the outside and inside of the main body. Each of the bottom members is formed into a circular shape having sufficient rigidity. A hole is formed in the central portion of any one of the bottom members. The hole is closed by a sealing film. The bottom members are fixed to the opposite opening ends of the main body, thus closing the opposite opening ends thereof and ensuring a shape maintenance property of the whole container.

When the fluid, for example adhesive, received in the container, is used, the sealing film for closing the hole is broken and a nozzle is connected to the hole. The container is then inserted into a cylinder of a fluid discharging apparatus such as a discharging gun. When a pressing body, which is slidable in the cylinder, presses the other bottom member of the container, the main body is squeezed so that its portion near the pressing body deforms into a bellows-shape. Consequently, the adhesive received in the container is discharged through the hole and the nozzle.

The press of the container by means of the pressing body causes increase in internal pressure of the main body, leading to expansion of the main body. As a result, the laminate forming the main body is strongly pressed against the inner surface of the cylinder so that a portion of the laminate may stick to the inner surface of the cylinder. A further advance of the pressing body in such a condition may cause the stuck portion of the laminate to be caught between the inner surface of the cylinder and the outer surface of the pressing body. If once the portion of the laminate is caught between them, the length thereof increases in proportion to the moving distance of the pressing body. When the length of the caught portion of the laminate exceeds the prescribed value, the pressing body cannot advance, thus making it impossible to discharge the adhesive from the container.

Japanese Patent Provisional Publication No. S56-51,265 discloses a method for preventing the occurrence of the above-mentioned catching problem of the laminate. The method comprises the steps of inserting a container into a tubular body, which is formed of a sheet-shaped film, and inserting both of the container and the tubular body into a cylinder. The tubular body placing between the inner surface of the cylinder and the outer surface of the container prevents the laminate from being caught between them.

According to the method disclosed in Japanese Patent Provisional Publication No. S56-51,265, it is necessary to put the tubular member outside the container whenever a new container for fluid is used, thus causing troublesome problems. After the fluid received in the container is used up, the tubular member is also subjected to disposal as waste, leading to an increased amount of wastes.

With respect to the third invention, the fluid discharging apparatus comprises a receiving tube having a pressing body, which is slidable in the inside of the receiving tube, a piston for urging the pressing body in the longitudinal direction of the receiving tube. When the piston presses a fluid-dispensing cartridge, which is put in the receiving tube, through the pressing body, the cartridge is squeezed from its end portion locating the pressing body side. Consequently, the fluid such as adhesive received in the cartridge is discharged through the opening end, which is opposite to the above-mentioned end portion.

The file for forming the cartridge has an extremely small thickness of from several ten $\mu$m to several hundred $\mu$m. As a result, in the conventional fluid discharging apparatus, there may occur a problem that a portion of the film is caught between the inner surface of the receiving tube and the outer surface of the pressing body during the movement of the piston. In view of such a problem, Japanese Utility Model Provisional Publication No. H6-77,855 discloses an apparatus in which ring-shaped projections are formed on the outer peripheral surface of the opposite ends of the pressing body so as to bring only these projections into contact with the inner peripheral surface of the receiving tube. According to such a structure, a contact surface pressure of the pressing body against the receiving tube can be increased, thus preventing the film from being caught between the receiving tube and the pressing body.

According to the apparatus disclosed in Japanese Utility Model Provisional Publication No. H6-77,855, it is possible to prevent the occurrence of catching problem of the film for a short period of time. However, it cannot provide such an effect for a long period of time.

More specifically, the projections of the pressing body move so as to be pressed against the inner peripheral surface of the receiving tube and come into contact with it, with the result that they wear away for a short period of time. In general, the pressing body is often formed of resin in view of making it light and saving the production costs. In such a case, the projections of the pressing body easily wear away rapidly. The wear of the projections decreases their external diameter accordingly, thus reducing the contact surface pressure of the projections against the receiving tube. As a result, there may cause the occurrence of the catching problem of the film. In the conventional apparatus, such a catching problem of the film may occur due to the wear of the pressing body. It is therefore impossible to prevent the occurrence of such a problem for a long period of time.

With respect to the fourth invention, the fluid discharging apparatus includes a fluid-discharging gun. The fluid discharging gun comprises a main body, a piston, which is reciprocally movable on the main body, and a cylinder having a pressing body, which is slidable in the inside of the cylinder. The main body has a supporting member to which the cylinder is detachably put. The cylinder is put on the supporting member so that the longitudinal axis of the cylinder coincides with the moving direction of the piston. The piston advances to come into the cylinder, thus moving the pressing body.

When the fluid-discharging gun having the above-described structure is used, the cartridge is inserted into the cylinder and the cylinder is put on the supporting member. The advance of the piston causes the movement of the pressing body. Consequently, the cartridge is squeezed to discharge the fluid such as adhesive from its front end in this manner. When the fluid received in the cartridge is used up, the piston is moved back to retreat from the cylinder. The cylinder is then detached from the supporting member. Then, the used cartridge placing on the front-end portion of the supporting member is removed so as to be subjected to disposal. The load of a new cartridge into the fluid discharging gun makes it possible to use again the gun.

The conventional fluid-discharging gun in which the cylinder is detachable from the main body has a problem that the exchange operation of the cartridge requires much labor.

More specifically, when a new cartridge is used, the cylinder is held with one hand and the new cartridge is held with the other hand. The cartridge is inserted into the cylinder. One of these hands can accordingly be unoccupied, with which the main body of the fluid discharging gun is held. Then, the cylinder is put on the supporting member of the gun. With respect to a soft-type cartridge, which is used up, the main body of the gun is held with one hand and the cylinder is detached from the supporting member by the other hand. Then, the cylinder is placed in the vicinity of an operator. Accordingly, the other hand becomes unoccupied and the used soft-type cartridge is removed from the main body of the gun by the other hand. In the conventional fluid-discharging gun, the operation for the main body of the gun and the operation for the cylinder cannot be carried out simultaneously in this manner. The passing operation of the main body of the gun, the cylinder or the cartridge from one hand to the other is required for exchange of the cartridge. In addition, the cartridge generally has a circular cross section. When the cartridge is placed in the vicinity of the operator after its removal from the main body of the gun, it may roll.

SUMMARY OF THE INVENTION

The first invention was made in view of the above-mentioned problems. An object of the first invention is to provide a plastic container, in which a larger effective area on which the printing is to be applied, in comparison with the conventional plastic container, can be provided on a tubular body, and it is possible to prevent wrinkles from occurring at the end of the tubular body and to prevent the end thereof from being turned up during the insert injection forming, as well as a method for manufacturing the above-mentioned container.

In order to attain the aforementioned object, the plastic container of the first invention comprises a main body formed of a plastic laminate film into a tubular shape; a large-diameter-formed member joined to an outer surface of an end of said main body by an insert-injection process; and a small-diameter-formed member jointed to an inner surface of another end of said main body by the insert-injection process. Arranging the small-diameter-formed member inside the main body permits to provide a larger effective area of the main body, on which the printing is to be applied, in comparison with the conventional plastic container.

The first invention includes the other type of the plastic container, which comprises a main body formed of a plastic laminate film into a tubular shape; a large-diameter-formed member joined to an inner surface of an end of said main body by an insert-injection process; and a small-diameter-formed member jointed to an inner surface of another end of said main body by the insert-injection process. Arranging both of the large-diameter-member and the small-diameter-formed member inside the main body permits to provide a far larger effective area of the main body, on which the printing is to be applied, in comparison with the conventional plastic container.

The first invention also includes a method for manufacturing a plastic container, which comprises the steps of: preparing a mold, which has a first cavity for forming a large-diameter-formed member and a second cavity for forming a small-diameter-formed member, said second cavity has an outside diameter, which is smaller than an inside diameter of said first cavity; forming a tubular body of a plastic laminate film; putting said tubular body on an outer surface of a mandrel serving as a core for said mold; placing said mandrel on which said tubular body has been put, in said mold so that an end of said tubular body locates inside said first cavity and another end thereof locates outside said second cavity; and injecting synthetic resin material in a molten state into said first and second cavities of said mold by an insert-injection process so as to form a large-diameter-formed member integrally with an outer surface of the end of said tubular body and form a small-diameter-formed member integrally with an inner surface of the other end of said tubular body. According to such a method, it is possible to pull easily the mandrel, which has been placed in the mold, from the mold, without being hindered by the formed members.

The first invention also includes the other method for manufacturing a plastic container, which comprises the steps of: preparing a mold, which has a first cavity for forming a large-diameter-formed member and a second cavity for forming a small-diameter-formed member, said second cavity has an outside diameter, which is smaller than an inside diameter of said first cavity; forming a tubular body of a plastic laminate film; putting said tubular body on an outer surface of a mandrel serving as a core for said mold; placing said mandrel on which said tubular body has been put, in said mold so that an end of said tubular body locates outside said first cavity and another end thereof locates outside said second cavity; and injecting synthetic resin material in a molten state into said first and second cavities of said mold by an insert-injection process so as to form a large-diameter-formed member integrally with an inner surface of the end of said tubular body and form a small-diameter-formed member integrally with an inner surface of the other end of said tubular body. According to such a method, it is possible to pull easily the mandrel, which has been placed in the mold, from the mold, without being hindered by the formed members.

An object of the second invention is to provide a container for fluid, which can solve the above-mentioned problems.

In order to attain the aforementioned object, the container for fluid of the second invention comprises: a main body formed of a laminate into a tubular shape having opposite opening ends, in which fluid can be received, said laminate comprising a plurality of flexible films; and a pair of closing devices, which close the opposite opening ends of said main body, respectively, which is characterized in that: adjacent two films of said plurality of flexible films are laminated so that at least one pair of opposing portions of said adjacent two films can independently behave as the flexible film.

In the second invention, there may preferably be adopted a structure that said adjacent two films are joined with each other by means of at least one joined portion and portions of said adjacent two films other than said at least one joined portion can independently behave as the flexible film.

The above-mentioned at least one joined portion is preferably formed into at least one circular-shaped joined portion, which circumferentially extends on said main body in a shape of circle.

The above-mentioned circular-shaped joined portion may locate in the end portion of said main body, in each of the opposite end portions thereof, or in the middle portion thereof in its longitudinal direction.

At least one longitudinal joined portion, which extends from the one end of said main body to the other end thereof, may further be formed as said at least one joined portion.

The above-mentioned at least one joined portion may preferably be formed by joining said adjacent two films by means of adhesive.

The above-mentioned adjacent two films preferably locate in the outermost position of said main body.

The above-mentioned main body may be formed by placing one edge portion of said laminate on another edge portion thereof, and joining an innermost film of the one edge portion of said laminate with an outermost film of the other edge portion thereof.

There may preferably be adopted a structure that the closing device for closing the one opening end of said main body comprises a front-bottom member with rigidity, which is formed into a circular shape having substantially the same diameter as that of the one opening end of said main body and has a hole formed in a central portion of said front-bottom member, and a sealing film for closing said hole; the closing device for closing the other opening end of said main body comprises a rear-bottom member with rigidity, which is formed into a circular shape having substantially the same diameter as that of the other opening end of said main body; and said one opening end of said main body is joined to a periphery of said front-bottom member and said other opening end thereof is joined to a periphery of said rear-bottom member.

An object of the third invention is to provide a fluid discharging apparatus, which can solve the above-mentioned problems.

In order to attain the aforementioned object, the fluid discharging apparatus of the third invention comprises: a receiving tube having a pressing body, which is slidable in an inside of said receiving tube; and a piston for urging said pressing body to move same, a fluid dispensing cartridge, which comprises a film and is to be inserted into said receiving tube, being capable of being squeezed by pressing said fluid dispensing cartridge through said pressing body by means of said piston, so as to discharge fluid from said fluid dispensing cartridge; which apparatus is characterized in that: said pressing body comprises a tubular member, which is slidable on an inner peripheral surface of said receiving tube, and a plate member formed on an inner peripheral surface of said tubular member; and a central portion of said plate member is to be pushed by means of said piston so that said plate member elastically deforms into a curved shape.

In the apparatus of the third invention, a peripheral portion of said plate member is preferably also pressed by said piston when force applied to said plate member by said piston exceeds a prescribed value.

In the apparatus of the third invention, said piston preferably comprises a central pressing portion for pressing said central portion of said plate member and a peripheral pressing portion for pressing a peripheral portion of said plate member, said peripheral pressing portion being separately formed from said central pressing portion.

The third invention also includes an installation apparatus for a fluid dispensing cartridge, which can detachably fitted to a fluid discharging apparatus having a piston and comprises: a receiving tube being capable of receiving in its inside the fluid dispensing cartridge comprising a film; and a pressing body being slidable in the inside of said receiving tube; movement of said pressing body by means of said piston of said fluid discharging apparatus causing said fluid dispensing cartridge to be squeezed; which apparatus is characterized in that: said pressing body comprises a tubular member, which is slidable on an inner peripheral surface of said receiving tube, and a plate member formed on an inner peripheral surface of said tubular member; and said plate member has a projection, which is formed on a central portion of at least one of opposite surfaces of said plate member, said piston being capable of coming into contact with said projection and pushing same so that said plate member elastically deforms into a curved shape.

In the above-mentioned installation apparatus of the third invention, said projection is preferably formed on the central portion of each of the opposite surfaces of said plate member.

In the above-mentioned installation apparatus of the third invention, said projection and a peripheral portion of said plate member are preferably pressed by said piston when force applied to said plate member by said piston exceeds a prescribed value.

An object of the fourth invention is to provide a fluid discharging apparatus, which can solve the above-mentioned problems.

In order to attain the aforementioned object, the fluid discharging apparatus of the fourth invention comprises: a main body; a piston, which is reciprocally movable on said main body; and a cylinder having a pressing body, which is slidable in an inside of said cylinder, said piston being capable of coming into said cylinder to move said pressing body so that a fluid dispensing cartridge, which is to be inserted into said cylinder, can be squeezed to discharge fluid from said dispensing cartridge; which apparatus is characterized in that: said cylinder is movable relative to said main body in a reciprocal moving direction of said piston and rotatable around a rotational axis, which is perpendicular to the reciprocal moving direction of said piston.

In the above-mentioned fluid discharging apparatus of the fourth invention, said rotational axis preferably locates in an central portion of said cylinder in its longitudinal direction. There may preferably be adopted a structure that said main body has a pair of supporting arms, which extend in a reciprocal moving direction of said piston; and said cylinder is positioned between said pair of supporting arms, said cylinder being supported at its opposite side portions on said pair of supporting arms so as to be movable in a longitudinal direction thereof and rotatable around the rotational axis, which is perpendicular to said pair of supporting arms.

In the above-mentioned fluid discharging apparatus of the fourth invention, there may be adopted a structure that a nozzle supporting device is provided at front ends of said pair of supporting arms, said nozzle supporting device being supported on said pair of supporting arms so as to be swingable around an axis, which is perpendicular to said pair of supporting arms; and a nozzle, which is to be connected to a front end of said fluid dispensing cartridge so as to discharge the fluid therefrom, is mounted on said nozzle supporting device.

In the above-mentioned fluid discharging apparatus of the fourth invention, there may be adopted a structure that said nozzle supporting device is slidable within a prescribed region in the longitudinal direction of said pair of supporting arms, a slide of said nozzle supporting device toward the front ends of said pair of supporting arms preventing said nozzle supporting device from swinging and the slide thereof toward a rear ends of said pair of supporting arms permitting said nozzle supporting device to swing.

DETAILED DESCRIPTION OF THE PREFERRED EMBODIMENTS

Now, embodiments of a plastic container of the first invention will be described in detail below with reference to the accompanying drawings.

Figure 1:
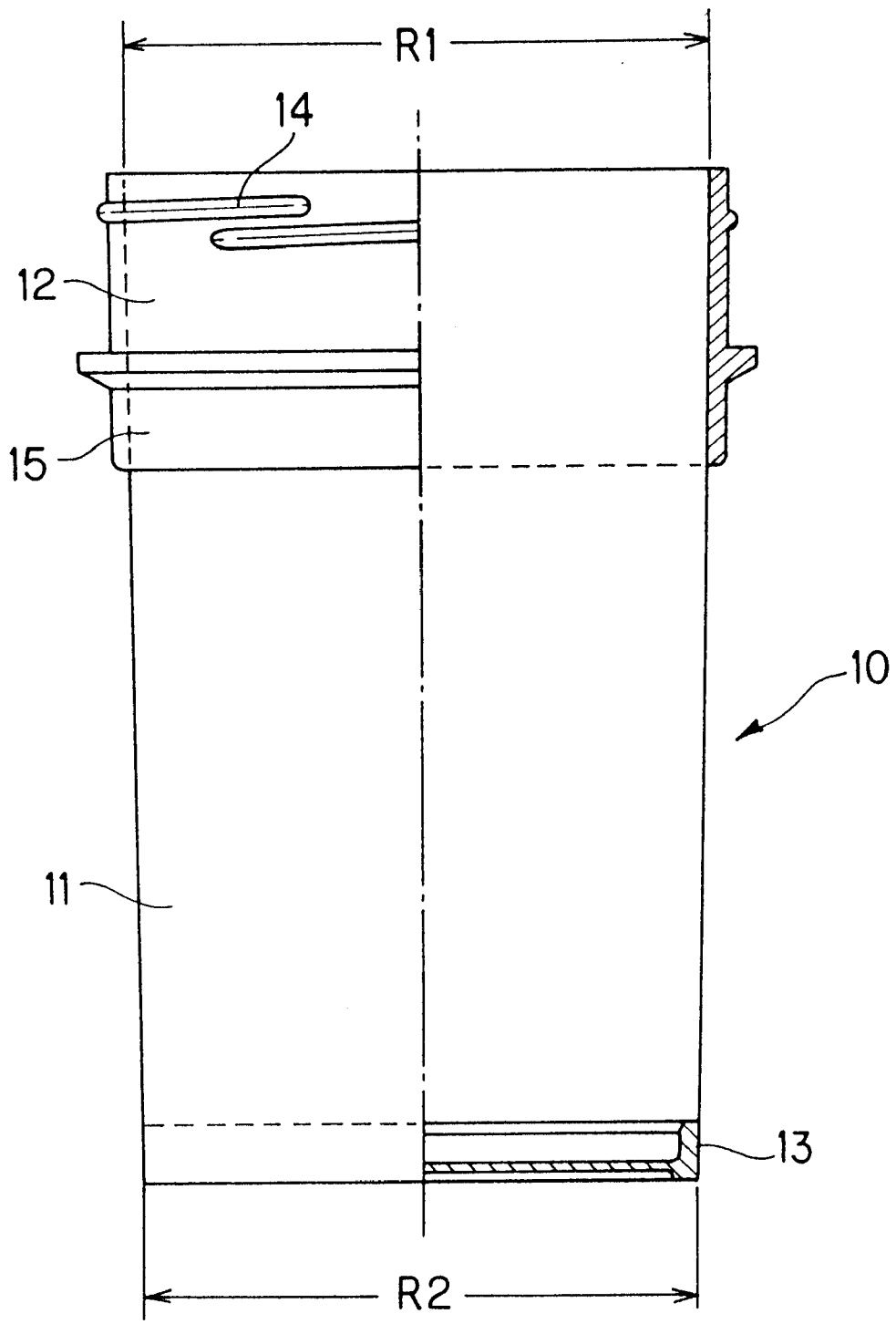
FIG. 1 is a front view having a half cross-sectional portion, illustrating a plastic container obtained in accordance with a manufacturing method of an embodiment of the first invention.

FIG. 1 illustrates an embodiment of the first invention, in which a plastic container is used as a container for ground coffee beans or powdery coffee (hereinafter referred to as the "coffee-container"). The coffee-container 10 is composed of a main body 11 that is formed of a plastic laminate film into a tubular shape, an upper-formed member 12 that is integrally formed with the outer surface of one end of the main body 11 and a lower-formed member 13 that is integrally formed with the inner surface of the other end of the main body 11.

The upper-formed member 12 is formed into a tubular shape, which is provided with an upper opening end having an inside diameter R1. The upper-formed member 12 is provided on the outer surface of its upper portion with a threaded portion 14 and on the outer surface of its lower portion with a grip portion 15. The upper opening end of the upper-formed member 12 is sealed with a cover member. A cap (not shown) is screwed on the threaded portion 14 of the upper-formed member 12.

The lower-formed member 13 is formed into a tubular shape with a bottom having an outside diameter R2. The outside diameter R2 of the lower-formed member 13 is designed to be smaller than the inside diameter R1 of the upper-formed member 12. More specifically, the upper-formed member 12 serves as the large-diameter-formed member and the lower-formed member 13 serves as the small-diameter-formed member.

The main body 11 has the tubular shape with the opposite opening ends. It can be obtained by cutting a plastic laminate film into a rectangular shape to form a sheet material and then joining the outer surface of one side edge of the thus formed sheet material with the inner surface of the other side edge thereof. For the preparation of the main body 11, there may be adopted a different process of joining the inner surface of the one side edge of the sheet material with the inner surface of the other side edge thereof (hereinafter referred to as the "first optional joining process"). There may be adopted another different process of placing the outer surface of the one side edge of the sheet material with the inner surface of the other side edge thereof and joining them with the use of an adhesive tape applied from the inside of the main body (hereinafter referred to as the "second optional joining process").

In view of an excellent moisture-proof property and an excellent gas isolating property, there may suitably be used as the above-mentioned plastic laminate film (i) a laminate of a polyethylene film having a thickness of 70 $\mu$m, a polyester film having a thickness of 12 $\mu$m, an aluminum foil having a thickness of 12 $\mu$m and a polyethylene film having a thickness of 70 $\mu$m, (ii) a laminate of a cast polypropylene having a thickness of 70 $\mu$m, a polyester film having a thickness of 12 $\mu$m, an aluminum foil having a thickness of 12 $\mu$m and a cast polypropylene having a thickness of 70 $\mu$m or (iii) a laminate of a cast polypropylene having a thickness of 70 $\mu$m, a polyester film having a thickness of 12 $\mu$m and a cast polypropylene having a thickness of 70 $\mu$m.

When the aluminum film is substituted by a film of ethylene-vinylalcohol copolymer or a silica-deposited film, it is possible to make the main body transparent, while maintaining the excellent moisture-proof property and gas isolating property. The contents received in the container can visually be observed from the outside thereof.

When the main body 11 for the coffee-container 10 is formed of the plastic laminate film including the aluminum foil, it is preferable to adopt the first or second optional joining process described above. When the contents to be received in the container is liquid such as fruit juice drink, which has a pH value of up to 4, it is preferable to adopt the second optional joining process for the formation of the main body 11 in order to prevent the aluminum foil from being oxidized to cause elution of aluminum in the liquid.

When the main body 11 for the coffee-container 10 is formed of the plastic laminate film including no aluminum foil, it is preferable to adopt the first or second optional joining process for the formation of the main body 11 in order to prevent the adhesive used in the lamination process from being eluted into the contents received in the container.

Now, description will be given below of the method for manufacturing the coffee-container 10.

The moisture of ground coffee beans or powdery coffee should be decreased as small as possible and the good aroma thereof should be maintained. Accordingly, the coffee-container 10 is required to have the excellent moisture-proof property and the excellent gas isolating property. For these reasons, the plastic laminate film having these excellent properties is selected to be used for the formation of the main body 11 for the coffee-container 10.

Figure 2:
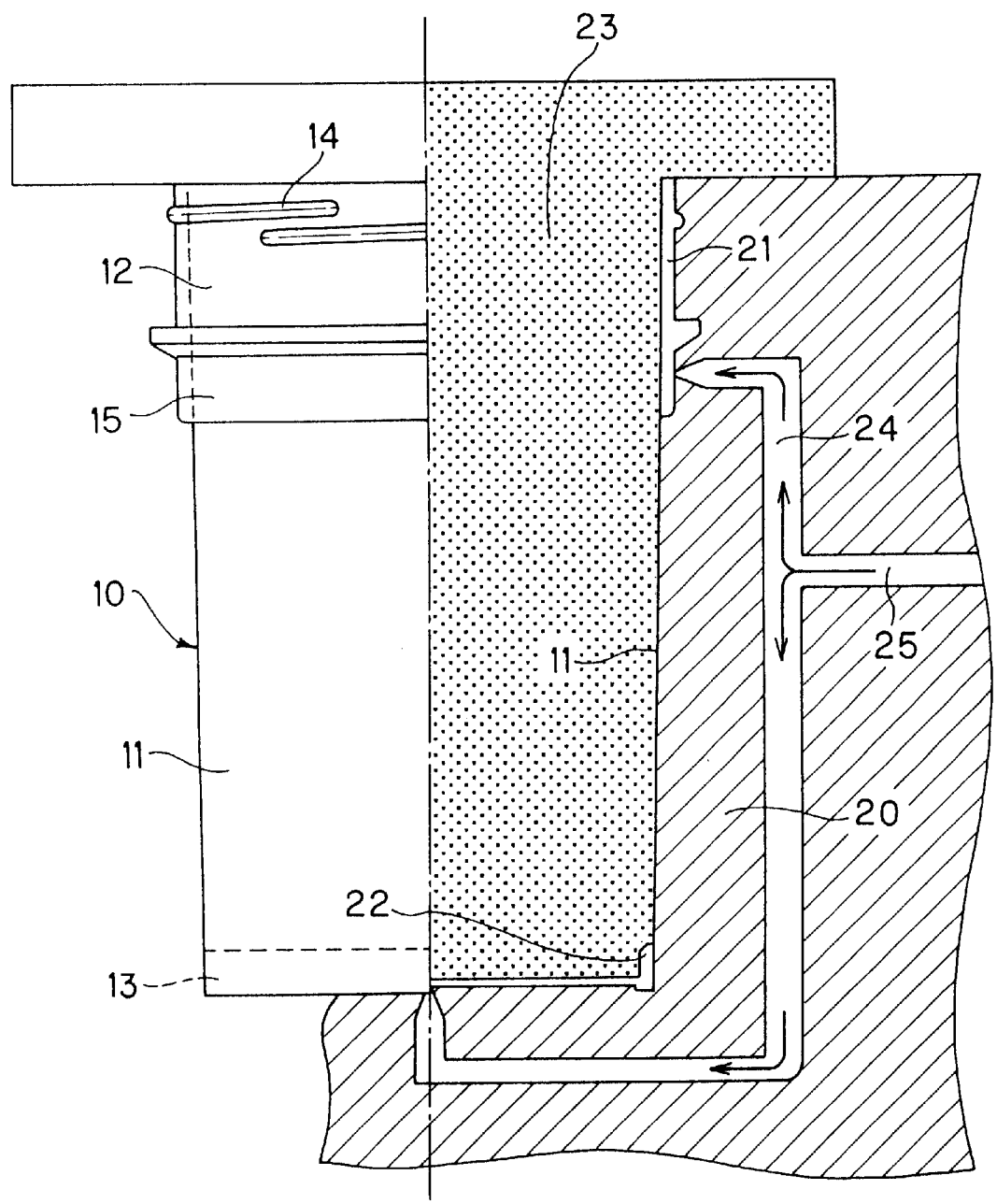
FIG. 2 is a schematic view illustrating the method of the embodiment of the first invention for manufacturing the plastic container.

A mold 20 for the formation of the coffee-container 10 has the first cavity 21 for forming the large-diameter-formed member and the second cavity 22 for forming the small-diameter-formed member as shown in FIG. 2. The first cavity 21 and the second cavity 22 are spaced from each other at a distance corresponding to the dimensions of the main body 11. The first cavity 21 has an inside diameter, which is larger than the outside diameter of the second cavity 22. The first cavity 21 of the mold has a shape corresponding to the upper-formed member 12 of the above-described coffee-container 10. The second cavity 22 of the mold has a shape corresponding to the lower-formed member 13 thereof. The lower-formed member 13, which is formed by the second cavity 22, has a bottom that provides the excellent moisture-proof property and the excellent gas isolating property.

The main body 11 is formed into a tubular shape of the plastic laminate film having the excellent moisture-proof property and the excellent gas isolating property. The thus formed main tubular body 11 is put on the outer surface of a mandrel 23, which serves as a core for the mold. When the main tubular body 11 has a circular cross section, the mandrel 23 also has the corresponding circular cross section. When the main tubular body 11 has a rectangular cross section, the mandrel 23 also has, on the other hand, the corresponding rectangular cross section.

Then, the mandrel 23 on which the main tubular body 11 has been put, is placed in the mold 20 so that the end of the main tubular body 11 locates inside the first cavity 21 and the other end thereof locates outside the second cavity 22. The mandrel 23, on which the main tubular body 11 has been put, can smoothly be inserted into the mold 20 due to the fact that the inside diameter of the first cavity 21 of the mold 20 is larger than the outside diameter of the second cavity 22 thereof.

Figure 3:
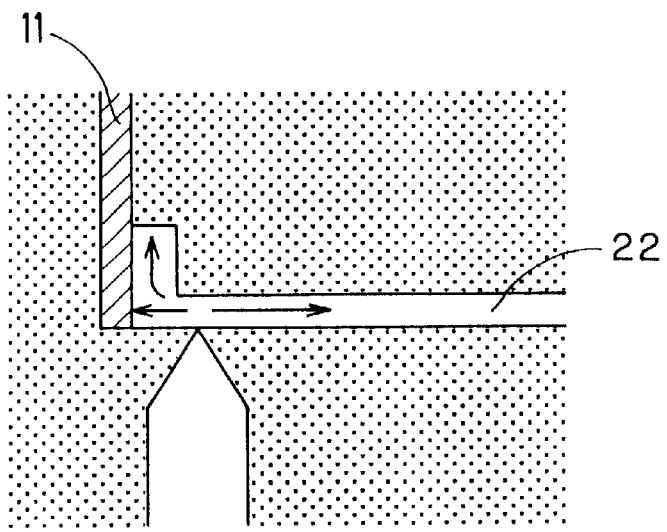
FIG. 3 is a view illustrating the second cavity for forming a small-diameter-formed member in the method of the embodiment of the first invention for manufacturing the plastic container.

After the completion of the placement of the mandrel 23 on which the main tubular body 11 is put, in the mold 20, synthetic resin material such as polyethylene resin is injected in a molten state into the first cavity 21 and the second cavity 22 of the mold 20 from a gate 25 formed therein through a runner 24 by means of an insert-injection process. In this case, even when the lower end of the main tubular body 11 reaches the bottom of the second cavity 22 as shown in FIG. 3, an injection pressure of the molten synthetic resin material is applied in directions that are indicated by arrows in FIG. 3 during the insert-injection process. Consequently, wrinkles does not occur at the end of the main tubular body 11 or the end of the main tubular body 11 is not turned up, irrespective of the injection pressure of the molten synthetic resin material.

After the completion of a cooling process which is applied to the molten synthetic resin material injected into the first cavity 21 and the second cavity 22, the formation of the coffee-container 10 in which the upper-formed member 12 is integrally formed with the outer surface of the end of the main tubular body 11 and the lower-formed member 13 is integrally formed with the inner surface of the other end of the main tubular body 11.

The mandrel 23 placed in the mold 20 is pulled out after the formation of the coffee-container 10. It is possible to easily pull the mandrel 23 from the mold without being hindered by the upper-formed member 13 due to the fact that the inside diameter of the first cavity 21 of the mold 20 is larger than the outside diameter of the second cavity 22 thereof.

In the above-described coffee-container 10, the lower-formed member (i.e., the smaller-diameter-formed member) 13, which is joined to the lower end of the main tubular body 11, locates on the inner surface of the main tubular body 11. As a result, it is possible to increase the effective area, on which the printing is to be applied, by an area occupied by the smaller-diameter-formed member 13.

In the coffee-container 10 of the above-mentioned embodiment, the upper-formed member 12 is integrally formed with the outer surface of the end of the main body 11, which is formed into the tubular shape of the plastic laminate film, and the lower-formed member 13 is integrally formed with the inner surface of the other end of the main body 11. It is possible to form the coffee-container 10 in which the upper-formed member 12 is integrally formed with the inner surface of the end of the main body 11, by changing the positional relationship between the mold 20 and the mandrel 23 on the outer surface of which the main body 11 is put. According to such a coffee-container 10, it is possible to increase the effective area, on which the printing is to be applied, by the total area occupied by the smaller-diameter-formed member 13 and the larger-diameter-formed member 12.

Figure 4:
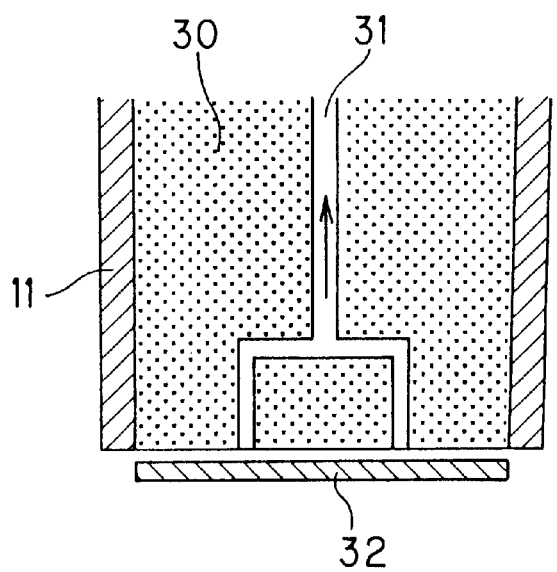
FIG. 4 is a schematic view illustrating the method of another embodiment of the first invention for manufacturing the plastic container.
Figure 5:
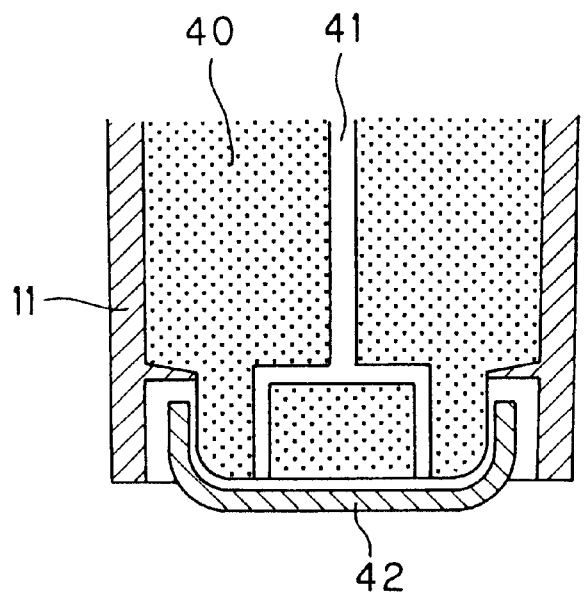
FIG. 5 is a schematic view illustrating the method of further another embodiment of the first invention for manufacturing the plastic container.
Figure 6:
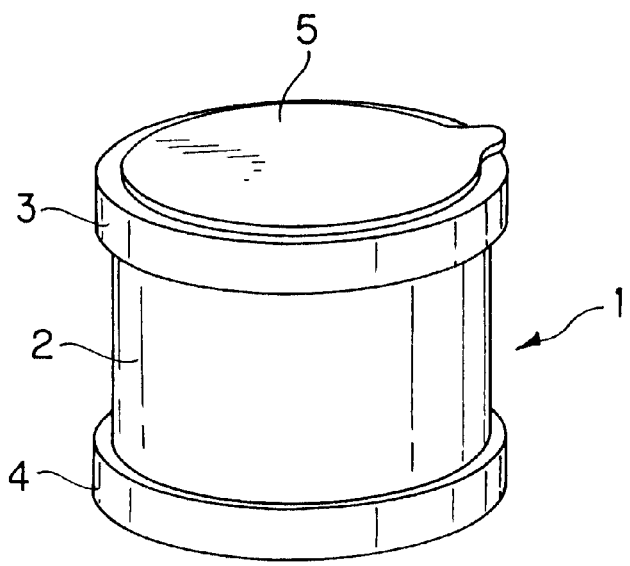
FIG. 6 is a perspective view illustrating a plastic container obtained by the conventional manufacturing method.

FIGS. 4 and 5 show the other embodiment of the first invention.

In the embodiment as shown in FIG. 4, a suction line 31 is formed in the mandrel 30 on the outer surface of which the main tubular body 11 is put. A laminate film 32 can be placed on the lower surface of the mandrel 30 by a suction effect. It is therefore possible to join the laminate film 32 integrally with the smaller-diameter-formed member 13 by injecting the synthetic resin material such as polyethylene resin in a molten state into the smaller-diameter-formed member 13 by means of the insert-injection process.

There may suitably be used as the above-mentioned plastic laminate film 32 (i) a laminate of a polyethylene film having a thickness of 70 $\mu$m, a polyester film having a thickness of 12 $\mu$m, an aluminum foil having a thickness of 12 $\mu$m and a polyethylene film having a thickness of 70 $\mu$m, (ii) a laminate of a polyethylene film having a thickness of 70 $\mu$m, a polyester film having a thickness of 12 $\mu$m, a film of ethylene vinyl alcohol (EVOH) copolymer resins (i.e., "EVAL" (trademark)) having a thickness of 15 $\mu$m and a polyethylene film having a thickness of 70 $\mu$m or (iii) a laminate of a polyethylene film having a thickness of 70 $\mu$m, a polyester film having a thickness of 12 $\mu$m, an aluminum foil having a thickness of 40 $\mu$m and a polyethylene film having a thickness of 70 $\mu$m.

In the embodiment as shown in FIG. 5, a suction line 41 is formed in the mandrel 40 on the outer surface of which the main tubular body 11 is put. A synthetic resin-formed body 42, which has previously been formed, can be placed on the lower surface of the mandrel 40 by a suction effect. It is therefore possible to join the synthetic resin-formed body 42 integrally with the smaller-diameter-formed member 13 by injecting the synthetic resin material such as polyethylene resin in a molten state into the smaller-diameter-formed member 13 by means of the insert-injection process.

The synthetic resin-formed body 42 can be obtained by subjecting a polyethylene film having a thickness of 70 μm, a polyester film having a thickness of 12 μm, an aluminum foil having a thickness of 40 μm and a polyethylene film having a thickness of 7 μm to a press-forming process. When the plastic container is used as a container in which invasion of oxygen should be avoided, it is preferable to form the synthetic resin-formed body 42 integrally with the small-diameter-formed member 13 of the plastic container in this manner.

Now, embodiments of a container for fluid of the second invention will be described in detail below with reference to FIGS. 7 to 15.

Figure 7:
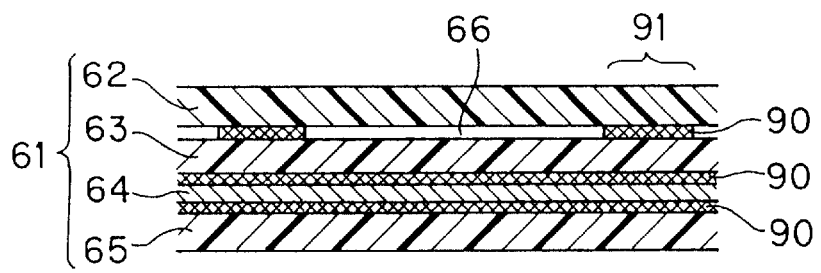
FIG. 7 is an enlarged cross-sectional view of a portion of a laminate used in a container for fluid of the second invention.
Figure 8:
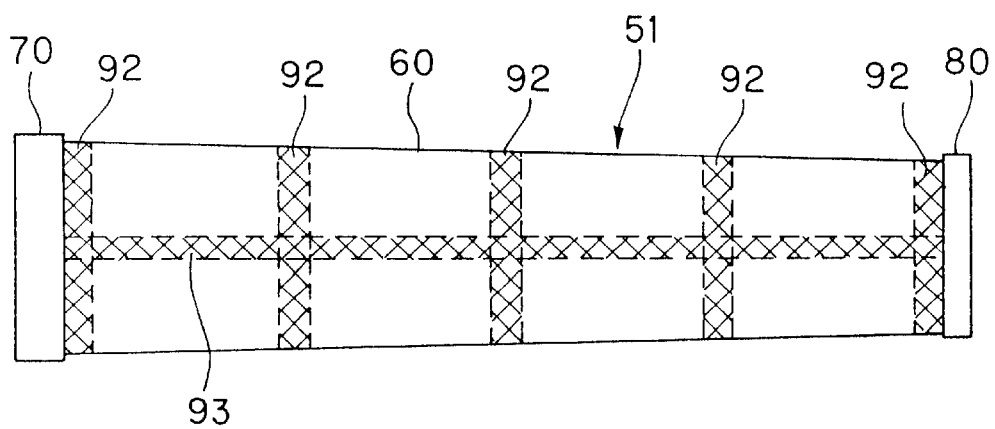
FIG. 8 is a side view illustrating an embodiment of the container for fluid of the second invention, in which the laminate as shown in FIG. 7 is used.
Figure 9:
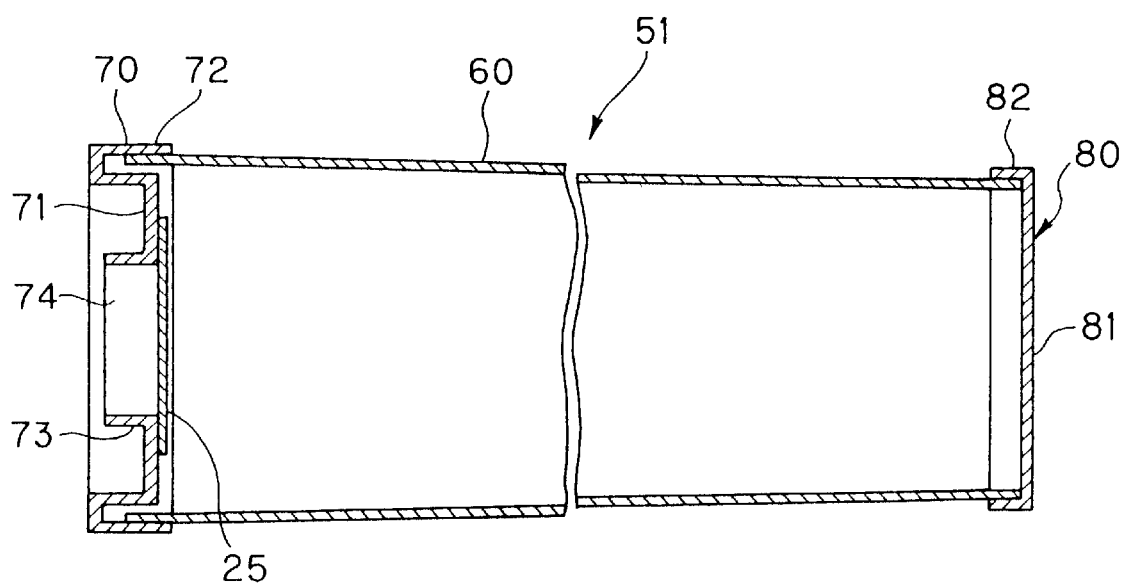
FIG. 9 is an enlarged longitudinal cross-sectional view of the container as shown in FIG. 8, in which a part of the container is omitted.

Description will be given below of one of the embodiments of the container for fluid of the second invention with reference to FIGS. 7 to 12. The container 51 for fluid of this embodiment is composed of a main body 60 having opposite opening ends, i.e., front and rear opening ends, and of a pair of closing devices, i.e., a front-bottom member 70 for closing the front opening end of the main body 60 and a rear bottom member 80 for closing the rear opening end of the main body 60, as shown in FIGS. 8 and 9.

The main body 60 is formed of a laminate 61 into a tubular shape. The laminate 61 comprises a plurality of flexible films (in general, at least three flexible films). The main body 60 tapers off from one end (i.e., the left-hand end in FIG. 8 (hereinafter referred to as the "front end") to the other end (i.e., the right-hand end in FIG. 8 (hereinafter referred to as the "rear end"). The main body 60 may have a cylindrical shape having a constant diameter over its longitudinal entirety. The main body 60 can receive in its inside various fluid such as adhesive, sealant, jam or the like.

Figure 12:
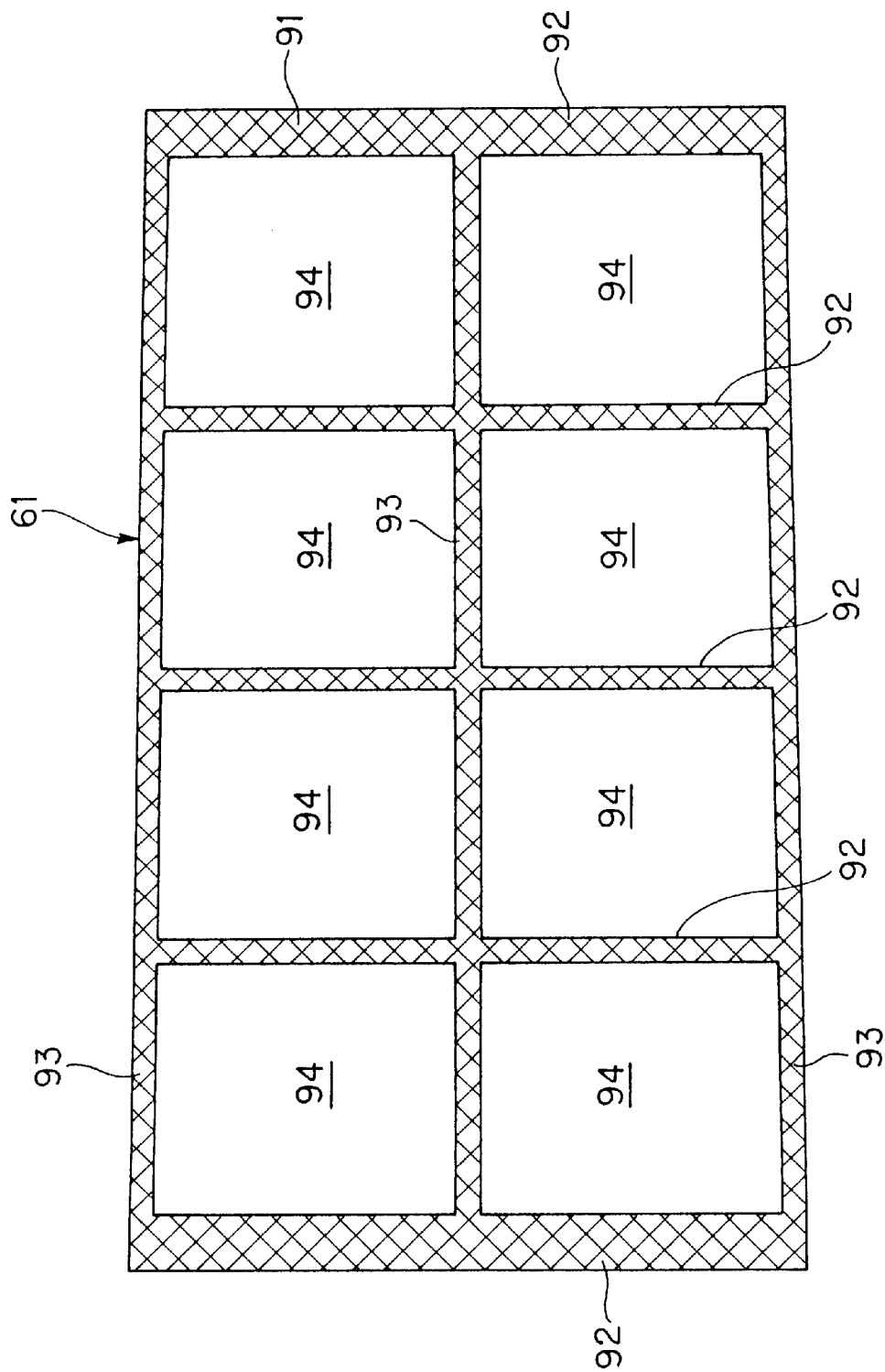
FIG. 12 is a plan view illustrating the entirety of the laminate as shown in FIG. 7.

The width of the laminate 61 becomes gradually smaller from the front end to the rear end as shown in FIG. 12 in correspondence to the tapered main body 60. The main body 60 can be formed by joining one longitudinal edge of the laminate 61 with the other longitudinal edge thereof as described later. The laminate 61 is composed of four films, i.e., the first to fourth films 62 to 65 as shown in FIG. 7, which locate from the outer peripheral side of the main body 60 toward the inner peripheral side thereof in this order.

When the container 51 is inserted into a cylinder C (see FIG. 13) of a fluid discharging gun or the other fluid discharging apparatus, the first film 62 comes into contact with the inner surface of the cylinder C. It is therefore preferable to use a film having an excellent scratching resistance and a small coefficient of friction, as the first film 62. The resin film is generally used as the first film 62. In this case, it is preferable to use a transparent polyethylene film having a thickness of from 30 μm to 60 μm. A cast polypropylene (CPP) film may be used.

The second film 63 is a resin film. Characters, devices, symbols and the like can easily be printed on the surface (appearing on the outer peripheral side of the main body 60) of the above-mentioned resin film. In this embodiment, a polyester film having a thickness of from 12 μm to 16 μm is used. A film of nylon or oriented polypropylene (OPP) may be used alternatively. The transparent first film 62 permits the characters or the like printed on the surface of the second film 63 to be observed visually from the outside of the main body 60.

The third film 64 has a function of imparting non-permeability to the laminate 61. A metallic foil is usually used as the third film 64. With respect to the metallic film, it is preferable to use an aluminum foil having a lightweight. The aluminum foil preferably has a thickness of from 9 μm to 12 μm.

The fourth film 65 has a function of protecting the third film 64, which is formed of the aluminum foil to prevent it from breaking during the manufacturing process of the container 51. A resin film is usually used as the fourth film 65. There is no specific limitation of material for forming the fourth film 65. However, the same polyethylene film as the first film 62 is used in this embodiment in view of the fact that the main body 60 is formed of the laminate 61. These aspects will be described later.

The second film 63 and the third film 64 are joined with each other over their entire opposing surfaces by adhesive 90. The third film 64 and the fourth film 65 are joined with each other in the same manner. The respective opposing portions of the first film 62 and the second film 63 are merely joined with each other by adhesive 90 (the portions of the first and second films 62, 63, which are joined with each other by the adhesive, are hereinafter referred to as the "joined portions" 91). The remaining portions of the first and second films 62, 63 other than the joined portions 91 are not joined with each other. As a result, the remaining portions of the first and second films 62, 63 other than the joined portions 91 can independently behave as the flexible film. Gaps having a height corresponding to the thickness of the adhesive 90 are formed between the above-mentioned remaining portions of the first and second films 62, 63. The supply of air into these gaps forms air layers 66 between the first and second films 62, 63. These air layers 66 have the advantage of improving an impact resistance of the main body 60. The above-mentioned adhesion process for joining the first and second films 62 and 63 with each other may be substituted by a fusion bonding process.

The first to fourth films 62 to 65 are subjected to a lamination process to form the laminate 61. In this case, application of adhesive onto at least one of the opposing surfaces of each set of the second and third films 63, 64 and the third and fourth films 64, 65 over its entirety may suffice prior to the lamination process. Application of adhesive onto a portion of at least one of the opposing surfaces of the first and second films 62 and 63, in which portion the joined portion 91 is to be formed, may suffice on the other hand.

Figure 10:
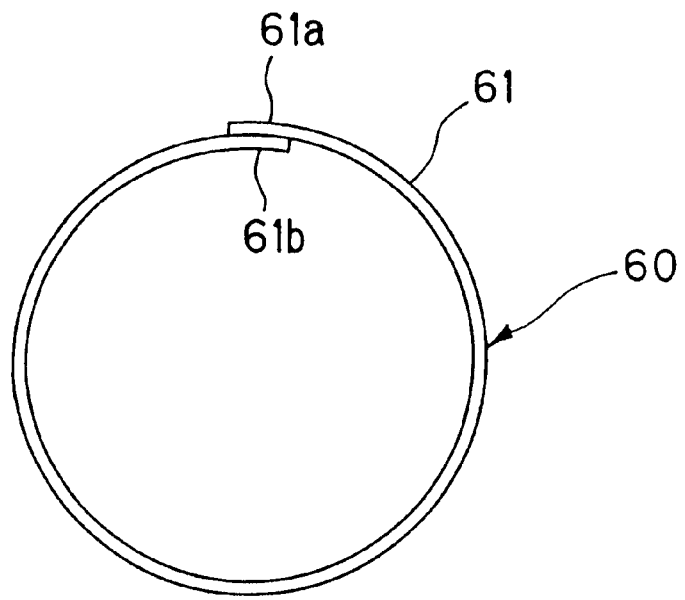
FIG. 10 is a view illustrating a method for preparing a main body for the container of the first invention with the use of the laminate.

The laminate 61 having the above-mentioned structure is wound up into a roll as shown in FIG. 10 and one edge 61a of the laminate 61 is placed on the other edge 61b thereof. The inner surface of the one edge 61a of the laminate (i.e., the inner surface of the first film 62) and the outer surface of the other edge 61b thereof (i.e., the outer surface of the fourth film 65) are jointed with each other by means of adhesive. The formation of the main body 60 is completed in this manner. The same kind of material is used for forming the first and fourth films 62 and 65 in order to improve the adhesive strength of the opposite edge portions 61a, 61b.

Figure 11:
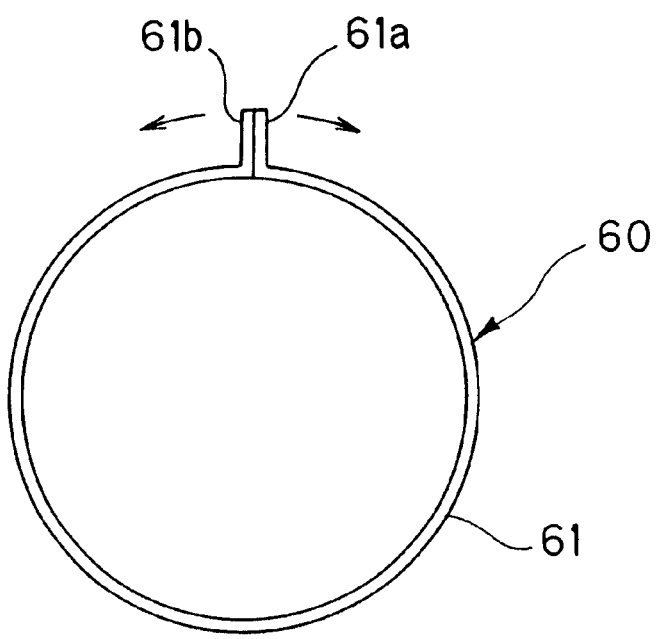
FIG. 11 is a view illustrating another method for preparing the main body for the container of the first invention with the use of the laminate.

The main body 60 may be formed by bending the opposite edge portions 61a, 61b of the laminate 61 so as to cause them to project outward in the diametrical direction of the main body 60 and joining the opposite edge portions 61a, 61b (on the inner surface of the fourth film 65) with each other by means of adhesive. In such a case, the joined portions 61a, 61b, which project outward, are pushed down in any one of directions, which are indicated by arrows in FIG. 11, and joined onto the outer surface of the main body 60 by means of adhesive. As a result, the joined portions of the main body 60 have a larger thickness than the remaining portion. In view of this fact, it is preferable to form the main body 60 in the manner as shown in FIG. 10. In the main body 60 as shown in FIG. 11 the opposite edge portions of the same film, i.e., the fourth film 65 are joined with each other. Consequently, the formation of the first film 62 of the different material from that of the fourth film 65 will cause no problem.

The other joining process may be adopted to form the main body 60 of the laminate 61. Provided that a sufficient adhesive strength can be ensured, the opposite edges of the laminate 61 may be butted together and joined with each other by mean of adhesive. In any one of the above-described joining processes, the adhesive joining may be substituted by a fusion bonding joining.

The front-bottom member 70 is formed of resin having a relatively high hardness. The front-bottom member 70 has a disc-shaped portion 71. The disc-shaped portion 71 is provided on its outer periphery with a tubular portion 72 having a dual-tubular structure. The inside diameter of the outer tube of the tubular portion 72 is substantially identical to the outside diameter of the front-end portion of the main body 60. The front-end portion of the main body 60 is fitted into the inner surface of the outer tube of the tubular portion 72 so as to be joined thereto by means of adhesive. The front opening end of the main body 60 is closed in this manner. There may be adopted a structure in which the front end portion of the main body 60 is fitted into the outer surface of the tubular portion 72 so as to be joined thereto by means of adhesive.

The disc-shaped portion 71 has on its central portion a projection 73, which projects outward in the opposite direction to the main body 60. The projection 73 has a hole 74, which passes through the central portion of the projection 73. A sealing film 75 is provided on the surface of the disc-shaped portion 71, which faces the main body 60, so as to close the hole 74. The sealing film 75 has a function of preventing fluid received in the main body 60 from leaking out.

The rear-bottom member 80 has a disc-shaped portion 81. The disc-shaped portion 81 is provided on its outer periphery with a tubular portion 82, which projects toward the main body 60. The inside diameter of the tubular portion 82 is substantially identical to the outside diameter of the rear end portion of the main body 60. The rear end portion of the main body 60 is fitted into the inner surface of the tubular portion 82 so as to be joined thereto by means of adhesive. There may be adopted a structure in which the rear end portion of the main body 60 is fitted into the outer surface of the tubular portion 82 so as to be joined thereto by means of adhesive.

FIG. 12 shows the laminate 61 in an expanded state. Portions where the joined portions 91 are formed are shown by cross-hatching in FIG. 12. As is clear from the figure, the joined portions 91 is composed of (i) portions that are formed so as to extend on the entire periphery of the front and rear ends of the main body 60, which is formed of the laminate 61, (ii) a portion that is formed so as to extend from the front end of the laminate 61 to the rear end thereof along the horizontal line, which passes through the center of the laminate 61, and (iii) portions (in this embodiment, three portions) that are formed so as to extend from the longitudinal upper edge of the laminate 61 to the longitudinal lower edge thereof at regular intervals.

When the main body 60 is formed by winding up the laminate 61 into a roll so as to place its longitudinal edge (i.e., the one edge 61a as shown in FIG. 10) on the other longitudinal edge (i.e., the other edge 61b as shown in FIG. 10), there are formed the joined portions 91 that have circular-shaped glued (joined) portions 92 circumferentially extending on the main body 60 and longitudinal glued (joined) portions 93 extending from the front end of the main body 60 to the rear end thereof in its longitudinal direction. The circular-shaped glued portions 92 are formed on the front and rear ends of the main body and the middle portion thereof so as to provide the total number of five. The longitudinal edge of the laminate 61 is glued onto the other longitudinal edge thereof, with the result that the two longitudinal glued portions 93 are formed on the periphery of the main body 60 so as to separate from each other by the central angle of 180 degrees of the main body 60.

Portions of the laminate 61 other than the circular-shaped glued portions 92 and the longitudinal glued portions 93 (i.e., the portions surrounded by the circular-shaped glued portions 92 and the longitudinal glued portions 93) are remained as non-glued portions (i.e., non-joined portions) 94 in which the first film 62 and the second film 63 are not glued to each other. In these non-glued portions 94, the first and second films 62 and 63 can independently behave as the flexible film.

Figure 13:
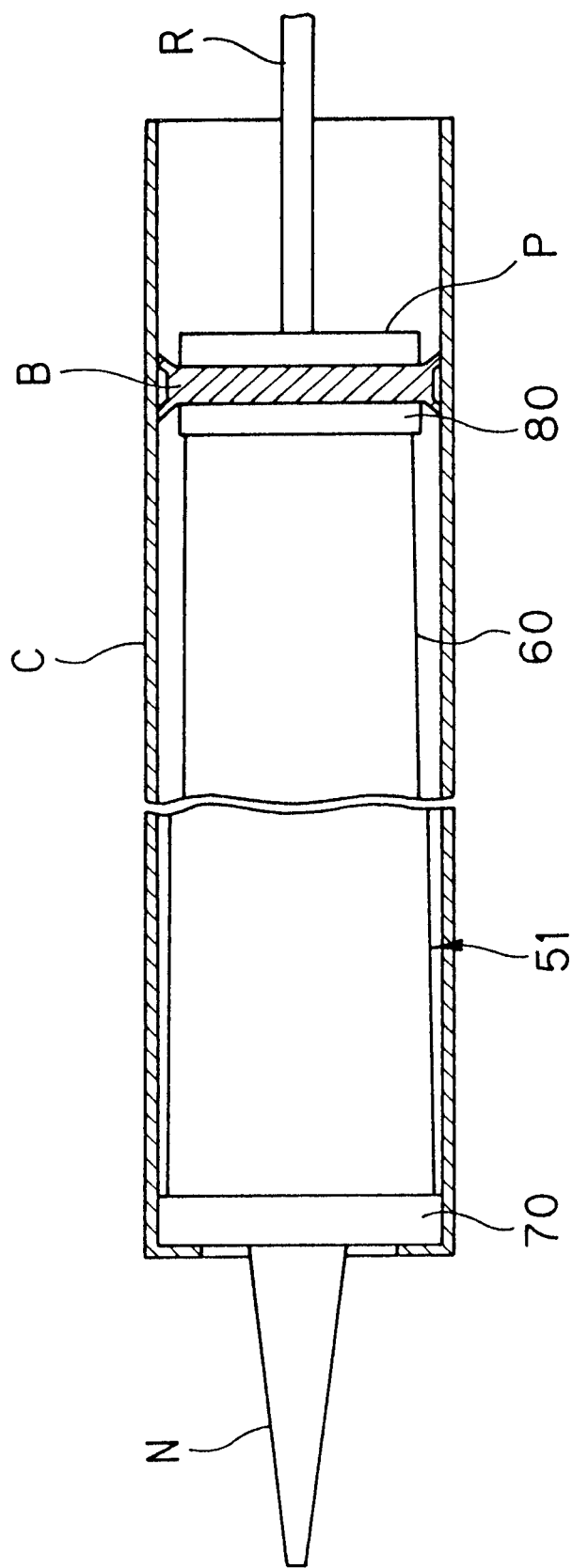
FIG. 13 is a cross-sectional view illustrating a state where the container as shown in FIG. 8 is put into a cylinder of a fluid discharging apparatus.

Now, description will be given below with reference to FIG. 13 of how to use the container 51 for fluid having the above-described structure. First, the sealing film 75 is broken and the nozzle N is fitted into the outer periphery of the projection 73 of the disc-shaped portion 71. It is easy to break the sealing film 75 with the use of the tip end of the nozzle N. Then, the container 51 is inserted into the cylinder C of a fluid discharging gun or the other fluid discharging apparatus. When a rod R pushes a pressing plate (i.e., a pressing body) B through the piston P, the main body 60 of the container 51 is squeezed so that its rear portion deforms into a bellows-shape. Consequently, the fluid received in the container 51 is discharged from the front opening end of the nozzle N.

The major portions of the first and second films 62 and 63 are not glued to each other so that these films can independently behave as the flexible film. As a result, the first film 62 serves as the separate tubular body, which is disclosed in Japanese Patent Provisional Publication No. S56-51,265, i.e., as the tubular body into which the container is to be inserted. It is therefore possible to prevent the laminate 61 forming the main body 60 from being caught between the inner surface of the cylinder and the outer peripheral surface of the pressing plate B. It is unnecessary to use, unlike the prior art disclosed in Japanese Patent Provisional Publication No. S56-51,265, the separate tubular body into which the container 51 is to be inserted, thus saving the labor accordingly and leading to a decreased amount of wastes due to no use of the separate tubular body.

The circular shaped glued (joined) portion 92 formed at the rear end of the main body 60 makes it possible to prevent more surely the occurrence of the above-mentioned catching problem of the laminate 61.

More specifically, the portions of the laminate 61, which correspond to the circular shaped glued portions 92 have a larger strength (i.e., a more excellent tenacious property) than that of the non-glued portions 94 in which the first and second films 62 and 63 are not glued to each other. Accordingly, when the pressing plate B presses the rear bottom member 80 of the container 51, the laminate 61 can deform inward at the boundary between the circular shaped glued portion 92, which is formed at the rearmost side of the main body 60, and the non-glued portion 94, which is in the vicinity of the above-mentioned circular shaped glued portion 92. As a result, the main body 60 can surely be squeezed to deform into the bellows-shape along with the advance of the pressing plate B. It is therefore possible to prevent more surely the occurrence of the catching problem of the laminate 61.

An experiment was made to recognize the effect of preventing the occurrence of the catching problem of the laminate 61. Containers outside the range of the present invention (hereinafter referred to as the "comparative container") were prepared in comparison with the container 51 of the present invention having the above-described structure. The comparative container had the same structure as that of the container 51 of the present invention except that the opposing surfaces of the first and second films 62 and 63 are glued to each other over its entirety. A discharging test of fluid was carried out for each of ten containers of the present invention and each of ten comparative containers with the use of the same fluid discharging apparatus. In any one of the containers of the present invention, there was observed no occurrence of the catching problem of the laminate 61. On the contrary, in all of the ten comparative containers, the catching problem of the laminate occurred. In one of the comparative containers, it became impossible to move the pressing plate B during the discharging operation so that the discharging operation could not be completed.

Figure 14:
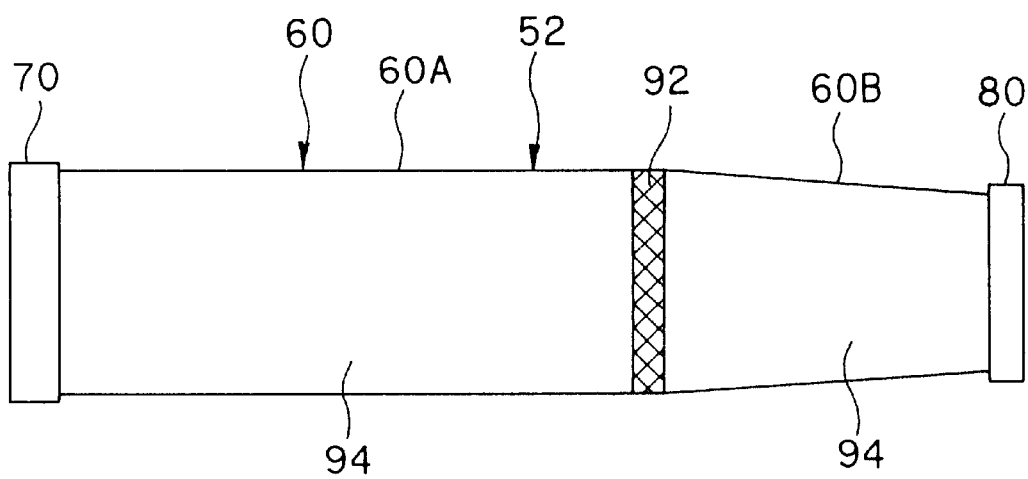
FIG. 14 is a side view illustrating another embodiment of the container for fluid of the second invention.
Figure 15:
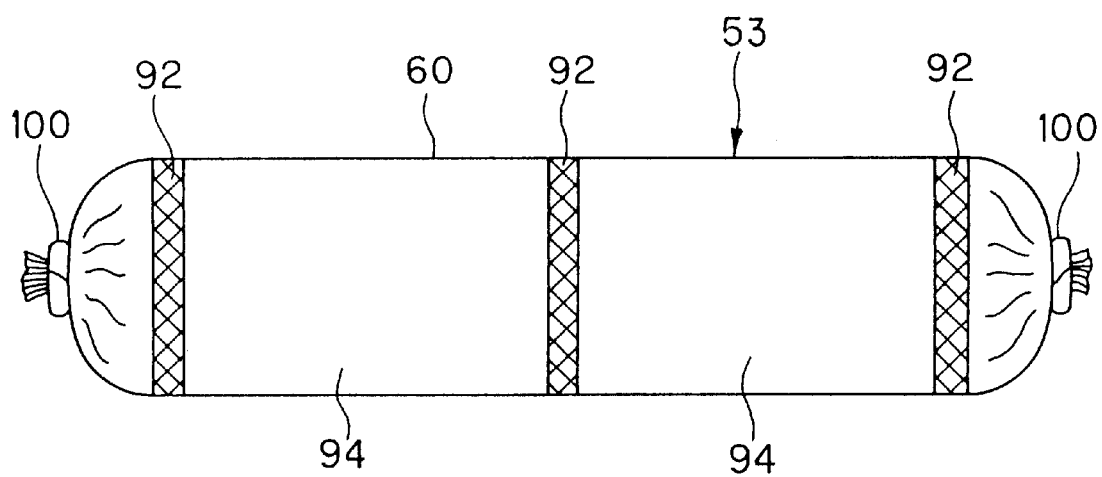
FIG. 15 is a side view illustrating further another embodiment of the container for fluid of the second invention.

Description will be given below of the other embodiments of the container of the second invention as shown in FIGS. 14 and 15. Only constructional components of the other embodiments of the second invention, which are different from those of the first embodiment of the second invention, will be described. The same reference numerals as those of the first embodiment of the second invention are given to the same constructional components and description of them is omitted.

The container 2 for fluid of the embodiment of the second invention as shown in FIG. 14 comprises a straight portion 60A and a tapered portion 60B. The straight portion 60A locates on the front side of the main body 60 and has a constant outside diameter and a length corresponding to the distance from two third to three fourth of the total length of the main body 60. The tapered portion 60B tapers off to its rear end. The front end of the tapered portion 60B is integrally formed with the rear end of the straight portion 60A. In the main body 60 having the shape described above, the catching problem of the laminate may easily occur at the boundary between the straight portion 60A and the tapered portion 60B. In view of this fact, the circular-shaped glued (joined) portion 92 is formed at the above-mentioned boundary. In this embodiment, the circular-shaped glued portion 92 is formed at the rear end of the straight portion 60A. The circular-shaped glued portion 92 may be formed at the front end of the tapered portion 60B. The circular-shaped glued portion 92 may extend from the rear end of the straight portion 60A to the front end of the tapered portion 60B. In addition to the above-mentioned circular-shaped glued portion 92, or in replacement thereof, the same circular-shaped glued portions 92 and the longitudinal glued portions 93 of the first embodiment of the second invention may be formed.

In the container 53 of the embodiment of the second invention as shown in FIG. 15, the opposite opening ends of the main body 60 are narrowed and closed by thick wires 100, 100 serving as the closing device, respectively. A circular-shaped glued (joined) portion is formed on each of the opposite ends and the center of a cylindrical portion of the main body 60, which has a constant diameter, except for the opposite narrowed portions. In this embodiment, longitudinal glued (joined) portions may be formed so as to extend horizontally between the adjacent circular-shaped glued portions 92, 92.

The second invention is not limited only to the above-described embodiments and includes further modified embodiments. The containers of the above-described embodiments have at least one circular-shaped glued portions 92. The containers may have no circular-shaped glued portion and have at least one longitudinal glued portion. It is however preferable to form on the entire periphery of the laminate 61 a glued (joined) portion 91 by which the circular-shaped glued portions provided on the opposite ends of the main body 60 and the at least one longitudinal glued portion are formed. When the glued portion 91 is formed on the entire periphery of the laminate 61 so as to have a rectangular closed configuration in this manner, it is possible to prevent the edge portions of the first and second films 62 and 63 from peeling off during the step of winding up the laminate 61 into a roll to form the main body 60. As a result, these films 62 and 63 can be handled as a single united member, thus leading to an easy manufacture of the main body 60.

A glued (joined) portion may be formed in a spiral shape in replacement of the circular-shaped glued portions 92 and the longitudinal glued portion 93. In addition to such a spiral-shaped glued portion, the circular-shaped glued portions may be formed on the opposite ends of the main body.

In the above-described embodiments of the second invention, the non-glued portions are formed between the second film 63 and the first film 62 locating in the outermost position of the main body. The non-glued portions 94 may be formed between the other adjacent two films.

There may be adopted a structure in which an additional film formed of the same material as that of the first film is provided between the first film 62 and the second film 63, the additional film is glued on the entire surface of the second film 63 and the glued portions 91 and the non-glued portions 94 are formed between the additional film and the first film 62. Such a structure makes it possible to improve the strength of the main body 60.

Now, embodiments of a fluid discharging apparatus of the third invention will be described in detail below with reference to FIGS. 16 to 23.

Figure 16:
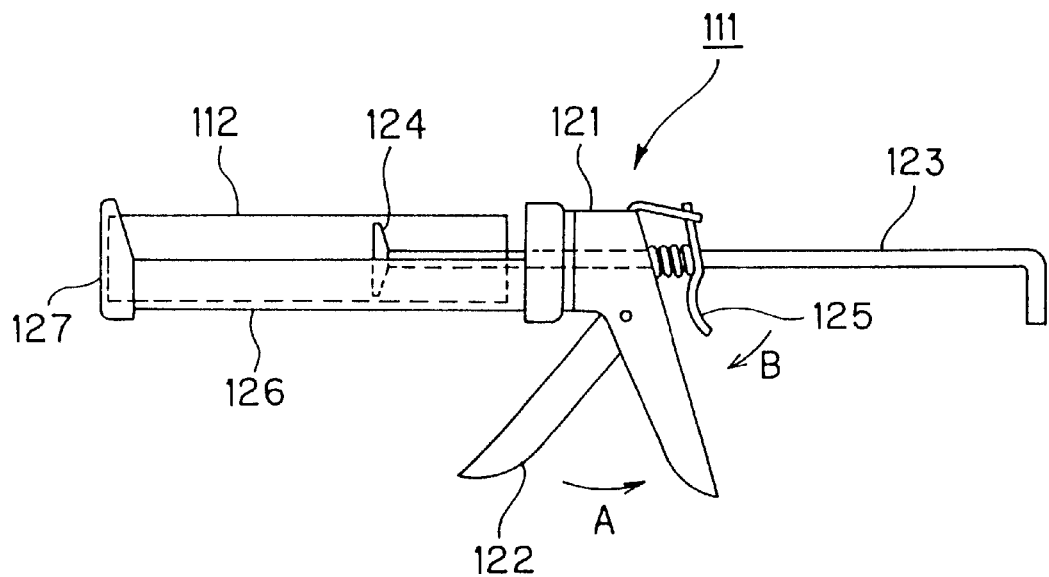
FIG. 16 is a side view illustrating an embodiment of a fluid discharging gun serving as the fluid discharging apparatus of the third invention.

FIG. 16 illustrates a fluid-discharging gun 111 as an embodiment of the fluid discharging apparatus of the third invention. The fluid discharging gun 111 has a main body 121. The main body 121 has a lever 122, which is provided thereon so as to be swingable. The swing motion of the lever 122 in the direction of an arrow A as shown in FIG. 16 advances a rod 123 and a piston 124 provided at the end of the rod 123 (i.e., moves them in the left-hand direction in FIG. 16). It is possible to cause the rod 123 and the piston 124, which have been in an advanced state, to retreat by swinging a holding lever 125 in the direction of an arrow B as shown in FIG. 16. The main body 121 is provided on its front edge with a supporting member 126, which is in parallel with the rod 123. The supporting member 126 is formed into a semi-circular tube having an upper opening, which extends in the longitudinal direction. The supporting member 126 has a stopper plate 127 having a horseshoe shape, which is fixed to the front edge of the supporting member 126.

Figure 17:
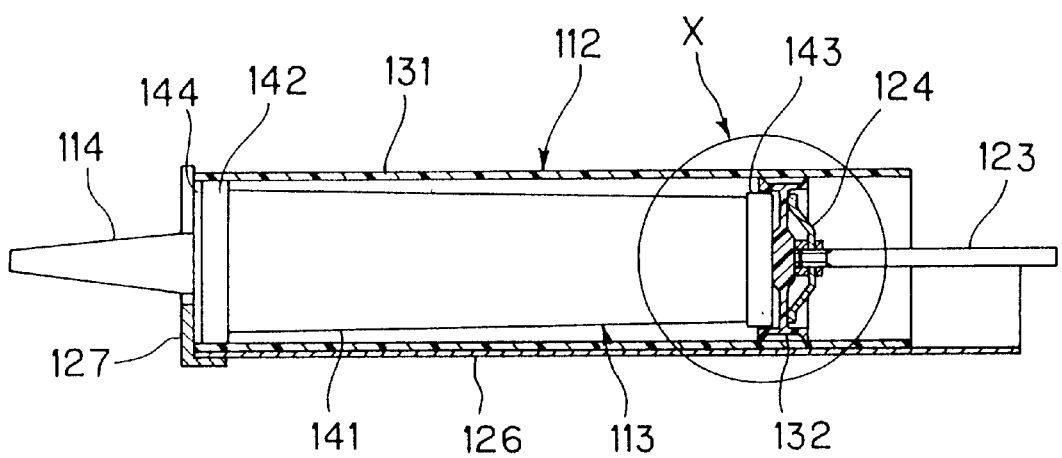
FIG. 17 is a cross-sectional view of essential components of the fluid-discharging gun as shown in FIG. 16.

FIG. 17 is a view illustrating a state in which an installation apparatus for a fluid dispensing cartridge (hereinafter referred to as the "cartridge installation apparatus") is fitted to the fluid discharging gun 111 described above. The cartridge installation apparatus 112 is composed of a receiving tube 131 having a tubular shape with opposite opening ends and of a pressing body 132, which is provided in the inside of the receiving tube 131 so as to be slidable. When the cartridge installation apparatus 112 is fitted to the fluid discharging gun 111, the pressing body 132 is located at the one end side of the receiving tube 131 and the receiving tube 131 is placed on the supporting member 126 so that the one end of the receiving tube 131 faces the piston 124.

Figure 18:
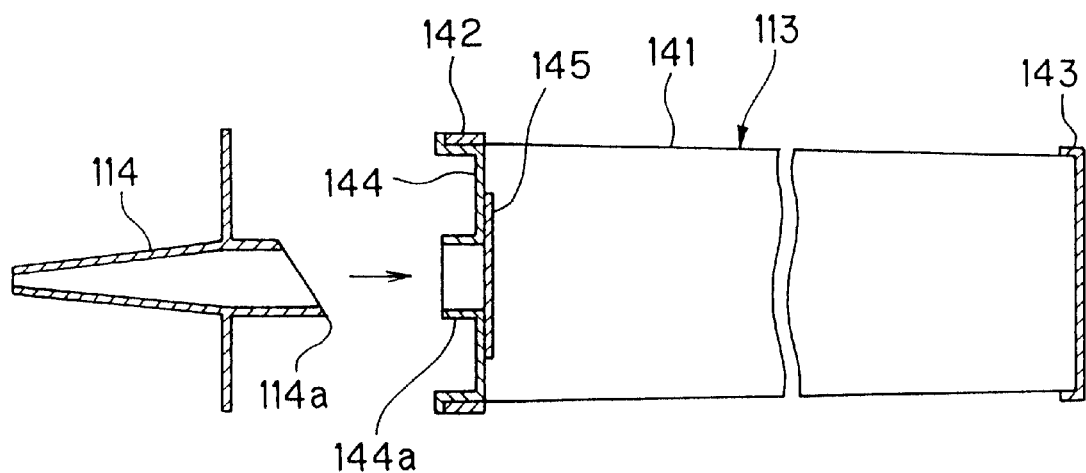
FIG. 18 is a side view illustrating an example of a fluid dispensing cartridge from which fluid can be discharged by means of the fluid discharging gun as shown in FIG. 16.

FIG. 18 is a view illustrating the fluid-dispensing cartridge (hereinafter simply referred to as the "cartridge") 113 that is to be fitted to the fluid discharging gun 111 through the above-mentioned cartridge installation apparatus. The cartridge 113 is obtained by forming a reinforcement tube 142 on the outer periphery of the opening end of a tube 141 formed of a single thin film or a plurality of thin films and forming a bottom 143 at the other opening end of the tube 141 to obtain a cartridge body, filling the cartridge body with fluid such as adhesive or the like and closing the opening end of the tube 141 with a plug member 144. The plug member 144 has a discharge port 144a, which is closed by a sealing sheet 145. In the cartridge 113 of this embodiment, the tube 141 tapers off from the plug member 144 to the bottom 143. The tube 141 may have a constant outside diameter over its longitudinal entirety.

When fluid is discharged from the cartridge 113 with the use of the fluid discharging gun 111, a nozzle 114 is fitted to the plug member 144 as shown in FIG. 18. The nozzle 114 has a sharp point 114a, which can break the sealing sheet 145 so as to permit the fluid received in the cartridge 113 to flow from the discharge port 144a into the nozzle 114. Then, the cartridge 113 is inserted from its bottom 143 side into the receiving tube 131 of the cartridge installation apparatus 112 as shown in FIG. 17. Then, the nozzle 114 passes through the stopper plate 127, thus completing the fitting step of the cartridge installation apparatus 112 to the fluid-discharging gun 111. After the completion of the fitting step mentioned above, the piston 124 advanced pushes the cartridge 113 through the pressing body 132. Consequently, the tube 141 is gradually squeezed from the bottom 141 side. The fluid received in the cartridge 113 is discharged from the nozzle 114 in this manner.

Figure 19:
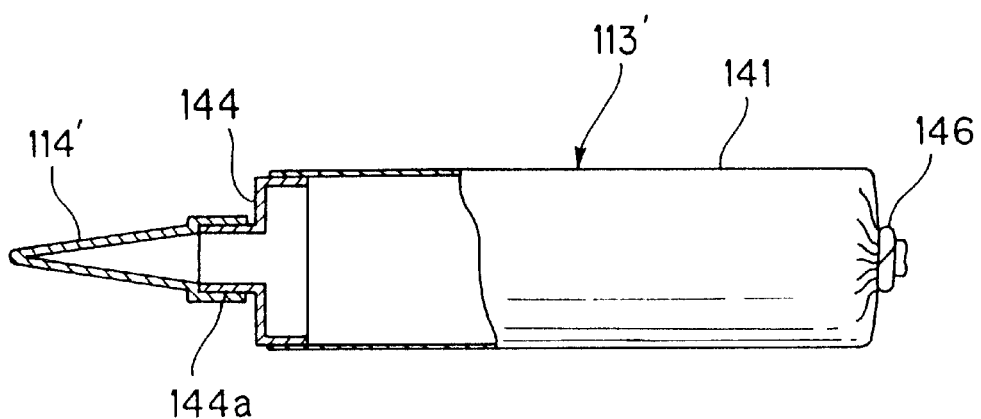
FIG. 19 is a side view illustrating another example of the fluid-dispensing cartridge, having a partial cross-sectional portion.
Figure 20:
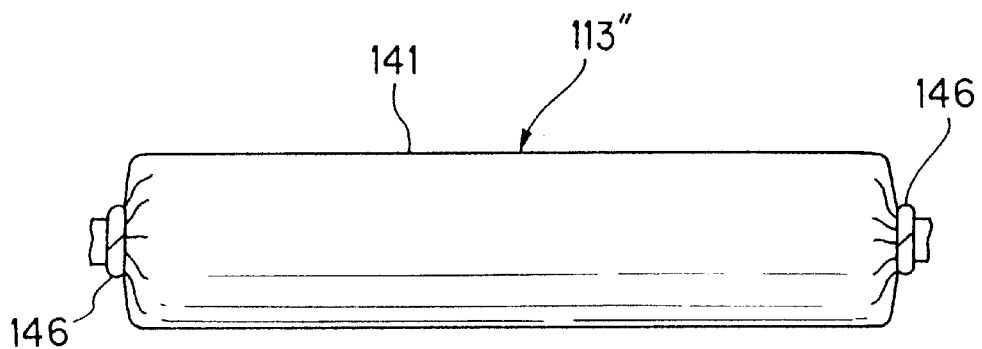
FIG. 20 is a side view illustrating further another example of the fluid-dispensing cartridge.

The cartridge 113 as shown in FIG. 18 may be substituted by the other cartridge 113' or 113" as shown in FIG. 19 or 20.

The cartridge 113' as shown in FIG. 19 has a structure in which a nozzle 114' having a closed tip end is screwed onto the discharge port 144a of the plug member 144 and the other opening end is narrowed and closed by a fastener 146 in replacement of the bottom 143. When the cartridge 113' is used, a cutter cuts off the tip end of the nozzle 114'.

The cartridge 113" as shown in FIG. 20 has a structure in which the opposite opening ends of the tube 141 are narrowed and closed by fasteners 146, 146, respectively. When the cartridge 113" is used, the one end of the tube 141 is cut to be opened and then the tube 141 is inserted into the receiving tube 131 of the cartridge installation apparatus 112. The nozzle is fitted into the opening end of the receiving tube 131, which locates in the one end of the tube 141, which has been cut off. Then, the cartridge installation apparatus 112 is fitted to the fluid discharging gun 111.

The fluid discharging gun 111 and the cartridge installation apparatus 112 has features described below that can prevent the thin film, of which the cartridge 113 (113', 113") is formed, from being caught between the inner peripheral surface of the receiving tube 131 and the outer peripheral surface of the pressing body 132.

First, description of the fluid discharging gun 111 will be given below. The above-mentioned piston 124 is composed of a disc-shaped member 128 and a pair of nuts 129a, 129b. The disc-shaped member 128 has a base plate 128a having a circular disc-shape, a tapered portion 128b extending forward from the periphery of the base plate 128a so that the outside diameter of the tapered portion 128b becomes gradually larger, and a ring-shaped portion 128c, which is integrally formed with the periphery of the tapered portion 128b so as to be in parallel with the base plate 128a. The rod 123 passes through the central portion of the base plate 128a. The nuts 129a, 129b locate on the opposite sides of the disc-shaped member 128, respectively, and engage with the front-end portion of the rod 123. The disc-shaped member 128 is fixed to the rod 123 by fastening the nuts 129a, 129b so as to held the disc-shaped member 128 between them.

The depth of the disc-shaped member 128, i.e., the distance "L" from the front surface of the ring-shaped portion 128c to the front surface of the base plate 128a is previously determined to be larger than the thickness of the nut 129a locating in the front side of the disc-shaped member 128, i.e., the distance "t" between the opposite surfaces of the nut 129a in its longitudinal direction. Accordingly, the front surface of the ring-shaped portion 128c of the disc-shaped member 128 locates in a position where is apart in the forward direction from the front surface of the nut 129a by the distance (L−t). The distance (L−t) can be changed by substituting the nut 129a with the other nut having the different thickness.

Figure 21:
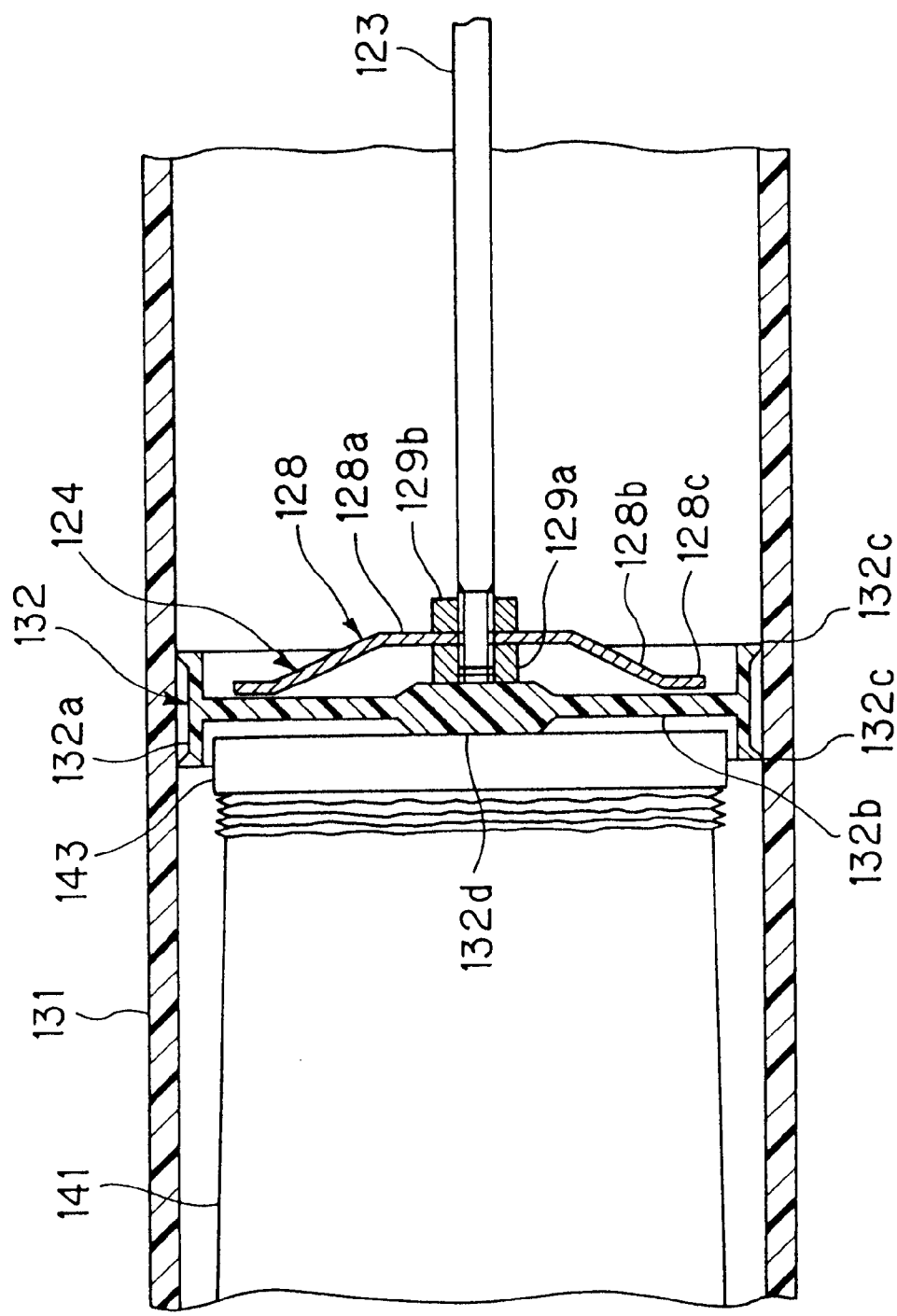
FIG. 21 is an enlarged view illustrating a zone defined by a circle "X" in FIG. 17.
Figure 22:
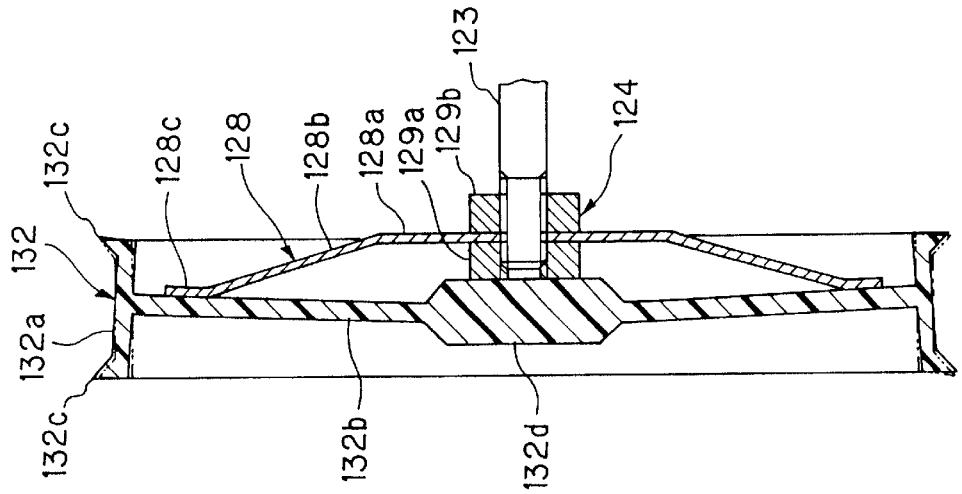
FIG. 22 is an enlarged cross-sectional view illustrating a state where a nut serving as a piston of the fluid discharging gun comes into contact with a projection of a pressing body.
Figure 23:
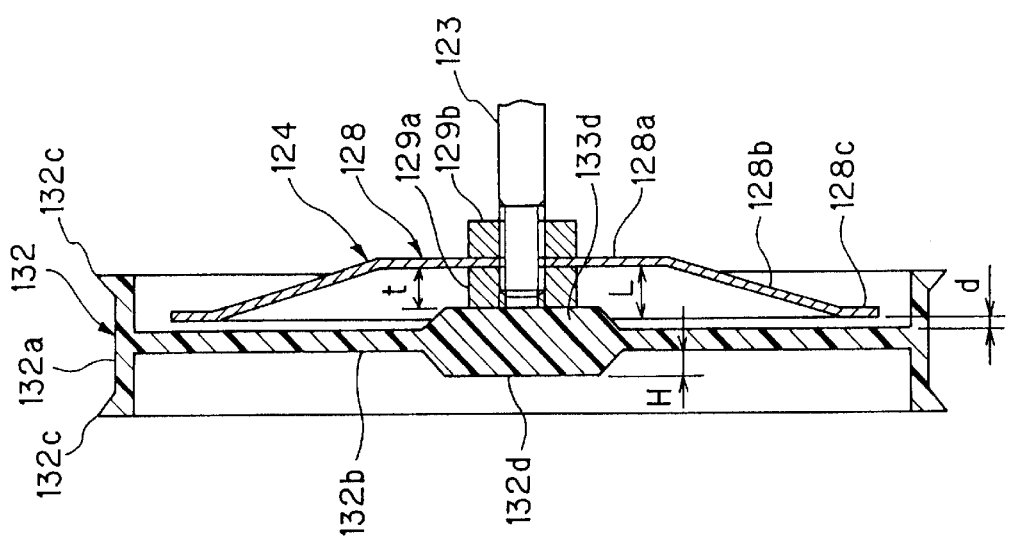
FIG. 23 is an enlarged cross-sectional view illustrating a state where a disc-shaped member serving as the piston of the fluid discharging gun comes into contact with a peripheral portion of a plate member of the pressing body.

In the cartridge installation apparatus 112, the pressing body 132 has a feature by which the catching problem of the film can be solved. More specifically, the pressing body 132 is formed of resin. The pressing body 132 is composed of a tubular member 132a formed into a short tube and of a plate member 132b, which is integrally formed with the inner surface of the tubular member 132a and has a circular shape, as shown in FIGS. 21 and 22. The tubular member 132a is composed of an intermediate portion and a pair of ring-shaped projection portions 132c formed at the opposite edges of the intermediate portion. The intermediate portion has an outside diameter, which is smaller than the inside diameter of the receiving tube 131. Each of the projection portions 132c has an outside diameter, which is slightly larger than the inside diameter of the receiving tube 131. The projection portions 132c come into contact with the inner surface of the receiving tube 131 under a prescribed pressure. On the contrary, the intermediate portion of the tubular member 132a does not come into contact with the receiving tube 131. Such a structure makes it possible to increase the contact pressure of the projection portions 132c with the receiving tube 131.

The tubular member 132a has an inside diameter, which is larger than the outside diameter of the disc-shaped member 128 of the piston 124. Accordingly, the piston 124 can move forward to locate in the tubular member 132a so as to come into contact with the plate member 132b without coming into contact with the tubular member 132a. The plate member 132b has a projection 132d formed on the central portion of the plate member 132b. The projecting length "H" of the projection 132d is previously determined so as to satisfy the following formula:

$$H > (L-t)$$

Accordingly, when the piston moves forward, the nut 129a of the piston 124 first comes into contact with the projection 132d of the plate member 132b. In this state, the ring-shaped portion 128c of the disc-shaped member 128 locates in a position where is apart in the rearward direction from the back surface of the plate member 132b by the distance "d=H−(L−t).

The plate member 132b has a thickness, which is smaller than the length of the tubular member 132a in its longitudinal direction. The plate member 132b is designed so that, when the nut 129a presses forward the central portion of the plate member 132b, the pressed surface of the plate member 132b becomes concave and the opposite surface thereof becomes convex, with the result that the plate member 132b elastically deforms into a curved shape over its entirety. The plate member 132b locates in the central portion of the tubular member 132a in its longitudinal direction. When the plate member 132b elastically deforms into the curved shape, the tubular member 132a also elastically deforms so that the outside diameter of the projection portion 132c locating in the front side in the longitudinal direction of the tubular member 132a (hereinafter referred to as the "front-side projection portion 132c") increases and the outside diameter of the projection portion 132c locating in the rear side in the longitudinal direction thereof decreases. The expansion of the front-side projection portion 132c is however limited by the receiving tube 131. Neither expansion nor contraction of the projection portions 132c does not actually occur and alternatively the contact pressure of the front-side projection portion 132c with the receiving tube 131 increases in accordance with a rate of increase in outside diameter of the front-side projection portion 132c.

The elastic deformation of the plate member 132b into the curved shape causes the projection 132d to be displaced forward relative to the periphery of the plate member 132b. As a result, the ring-shaped portion 128c of the disc-shaped member 128 comes close to the peripheral portion of the plate member 132b. When the displacement δ satisfies the following formula:

$$\delta = H - (L - t)$$

the ring-shaped portion 128c of the disc-shaped member 128 comes into contact with the peripheral portion of the plate member 132b. After the ring-shaped portion 128c comes into contact with the peripheral portion of the plate member 132b, almost no further deformation of the plate member 132b occurs, even when the pressing force of the piston 124 against the plate member 132b is further increased. As a result, it is possible to prevent the contact pressure of the front-side projection portion 132c with the receiving tube 131 from increasing further, so as to be maintained in the prescribed range.

In this embodiment of the third invention, the nut 129a serves as a central pressing portion and the disc-shaped member 128 serves as a peripheral pressing portion.

The inside diameter of the tubular member 132a is slightly larger than the outside diameter of the bottom 143 of the cartridge 113. When the pressing body 132 presses the bottom 143 of the cartridge 113, the bottom 143 comes into the tubular member 132a so that the projection 132d can press the central portion of the bottom 143. There may be adopted a structure in which the end surface of the tubular member 132a presses the bottom 143 of the cartridge 113.

In the fluid discharging apparatus 111 of this embodiment, the nut 129a presses the projection 132d formed on the central portion of the plate member 132b of the pressing body 132 to deform elastically the plate member 132b. Consequently, it is possible to bring the projection portion 132c, which locates in the front side in the moving direction of the piston 124 (i.e., the front-side projection portion 132c), into contact with the inner surface of the receiving tube 131 under the high pressure. It is therefore possible to prevent the film, of which the tube 141 of the cartridge 113 is formed, from being caught between the front-side projection portion 132c and the receiving tube 131. The elastic deformation of the plate member 132b and the tubular member 132a increases the pressure by which the projection portion 132c is pressed against the receiving tube 131. Even when a slight wear of the projection portion 132c occurs, there is almost no decrease in contact pressure of the projection portion 132c with the receiving tube 131. When a severe wear of the projection portion 132c occurs, increase in the elastic deformation limit of the plate member 132b makes it possible to maintain the high contact pressure of the projection portion 132c with the receiving tube 131. As a result, the high contact pressure of the projection portion 132c with the receiving tube 131 can be maintained for a long time of period. It is therefore possible to prevent the catching problem of the film from occurring for a long period of time.

The contact pressure of the front-side projection portion 132c with the receiving tube 131 can be determined in correspondence to the elastic deformation of the plate member 132b. The elastic deformation of the plate member 132b can be determined by the deviation "d", i.e., the distance between the front surface of the nut 129a, which is to come into contact with the projection 132d of the pressing body 132, and the front surface of the ring-shaped portion 128c of the disc-shaped member 128, which is to come into contact with the plate member 132b of the pressing body 132. It is therefore possible to adjust the contact pressure of the front-side projection portion 132c with the receiving tube 131 by changing the thickness of the nut 129a. In view of this fact, the use of the nut 129a having a large thickness suffices when a small wear of the front-side projection portion 132c is observed. The nut 129a is changed to the other nut having a larger thickness in accordance with an amount of wear of the front-side projection portion 132c. Such a system makes it possible to maintain the almost constant high contact pressure of the projection portion 132c with the receiving tube 131 for a long period of time.

In the cartridge installation apparatus 112 of the third invention, the projection 132d is formed on each of the opposite surfaces of the plate member 132b. After the pressing body 132 moves in the left-hand direction in FIG. 17 until the fluid received in the cartridge 113 (113', 113") is used up, the cartridge 113 is removed from the left-hand opening of the receiving tube 131. Then, a new cartridge is inserted into the receiving tube 131 from its right-hand opening. The receiving tube 131 with the new cartridge is turned over and put into the fluid-discharging gun 111. In this case, the piston 124 presses the projection 132d, which locates in the rear side in FIGS. 17 and 21, and the projection portion 132c locating in the rear side in FIGS. 17 and 21 is located in the front side in the moving direction of the piston 124 so as to come into contact with the inner surface of the receiving tube 131 under high pressure. The service life of the pressing body 132 can be increased twice.

The third invention is not limited only to the above-described embodiments and includes further modified embodiments.

In the above-described embodiments of the third invention, the piston 124 is composed of the disc-shaped member 128 and the pair of nuts 129a, 129b. The disc-shaped member 128 may be used as the piston and the rod 123 may be formed integrally with the disc-shaped member 238 or fixed thereto. There may be adopted a structure in which the rod 123 is provided with a flange in replacement of the nut 129b, the nut 129a is formed integrally with the disc-shaped member 128 and the above-mentioned rod 123 is screwed into the nut 129a to bring the disc-shaped member 128 into contact with the flange. In the above-described embodiments, the nut 129a can come into contact with the projection 132d of the pressing body 132. When the tip end of the rod 123 projects from the nut 129a, the projected tip end of the rod 123 may come into contact with the above-mentioned projection 132d. In this case, the tip end of the rod 123 serves as the central pressing portion of the piston 124.

Now, embodiments of a fluid discharging apparatus of the fourth invention will be described in detail below with reference to FIGS. 24 to 33.

Figure 32:
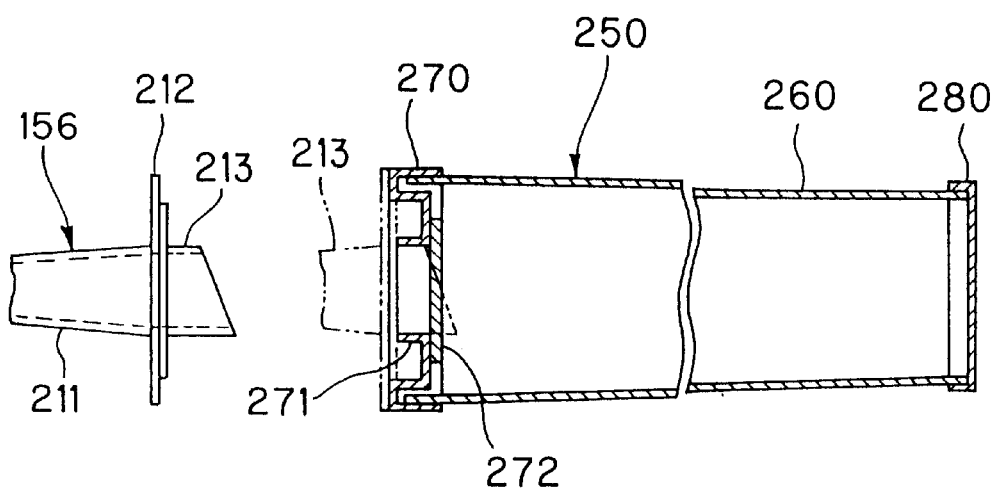
FIG. 32 is a cross-sectional view illustrating an example of the cartridge used in the embodiment as shown in FIGS. 24 to 31.
Figure 33:
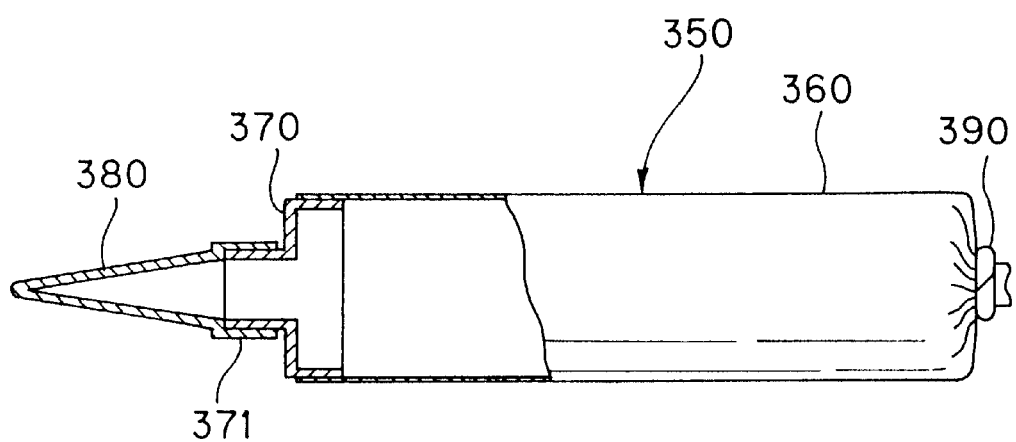
FIG. 33 is a cross-sectional view illustrating another example of the cartridge used in the fluid discharging gun serving as the fluid discharging apparatus of the fourth invention, which view has a partial cross-sectional portion.

In the embodiment, the fourth invention is applied to a fluid discharging gun (a fluid discharging apparatus) 151 as shown in FIGS. 24 to 29. A fluid dispensing cartridge (hereinafter simply referred to as the "cartridge") 250 as shown in FIG. 32 is used for the fluid discharging gun 151. The fourth invention may be applied to the other kind of fluid discharging apparatus than the fluid discharging gun 151. The other kind of cartridge than the cartridge 250, for example a cartridge 350 as shown in FIG. 33 may be used.

First, the cartridge 250 will be described below for convenience. The cartridge 250 is composed of a main body 260, a reinforcement tube 270 and a bottom 280. The main body 260 is formed of a single thin film or a plurality of thin films into a tubular shape. The reinforcement tube 270 is provided on the outer periphery of the front opening end of the main body 260. The bottom 280 closes the rear-opening end of the main body 260. The main body 260 tapers off from its front end to its rear end. The main body 260 may have a constant outside diameter over its longitudinal entirety. The reinforcement tube 270 has in its central portion a discharge port 271. The inside diameter of the discharge port 271 becomes gradually smaller from the front end of the discharge port 271 to the rear end thereof. The rear-opening end of the discharge port 271 is closed by means of a sealing member 272, which is formed of a thin film. The sealing member 272 may be broken by mean of a tubular insertion member 213 of a nozzle 156, which is to be fitted into the discharge port 271, described later. As a result, fluid such as adhesive or the like received in the cartridge 250 can be discharged outside from the discharge port 271 through the nozzle 156.

Figure 24:
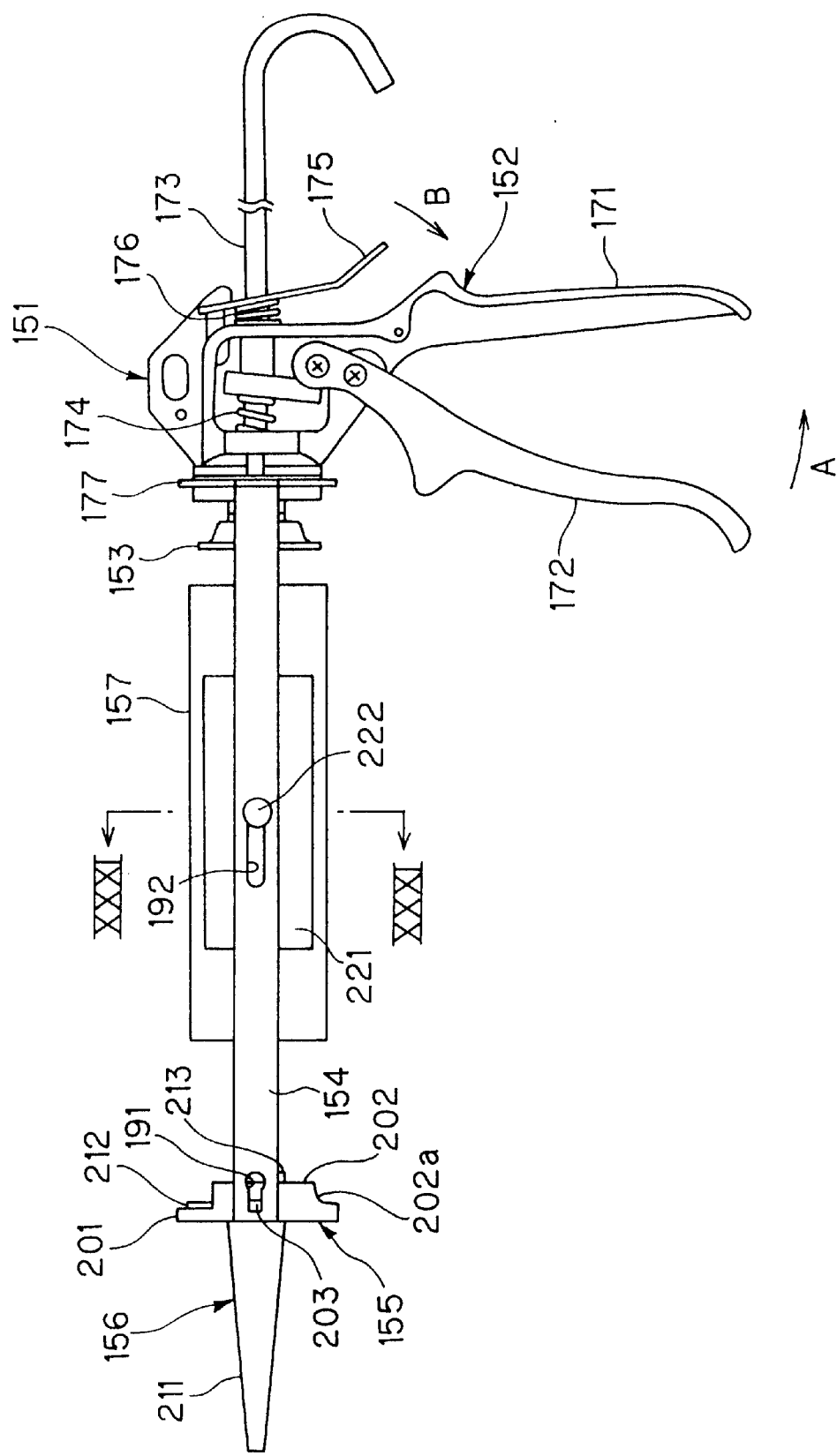
FIG. 24 is a side view illustrating an embodiment of a fluid discharging apparatus of the fourth invention in a state where a cylinder is in parallel with a pair of supporting arms.

Then, description will be given below of the fluid-discharging gun 151 for discharging the fluid from the above-mentioned cartridge 250. The fluid discharging gun 151 has a main body 152 as shown in FIGS. 24 to 27. The main body 152 is provided with a grip portion 171 and an operation lever 172. A swing motion of the operation lever 172 in the direction of an arrow A as shown in FIG. 24 causes a rod 173 to move forward in accordance with the swing motion, with the result that a piston 173 provided at the tip end of the rod 173 also moves forward. When the grip of the operation lever 172 is released, the operation lever 172 is returned to the original position by means of a spring 174. The repetition of the gripping operation of the operation lever 172 and the release thereof causes the rod 173 and the piston 153 to move forward. It is possible to cause the rod 173 and the piston 153, which have been in an advanced state, to retreat by swinging a holding lever 175 in the direction of an arrow B as shown in FIG. 16 against an expansive force given by a spring 176. The fluid-discharging gun 152 of the fourth invention has the same fundamental structural components as those of the conventional fluid-discharging gun. The detailed description thereof is therefore omitted.

The main body 152 is provided with a supporting plate 177 having a circular shape. The above-mentioned rod 173 passes through the central portion of the supporting plate 177. The supporting plate 177 is rotatable around its central axis relative to the main body 152. The frictional resistance between the supporting plate 177 and the main body 152 prevents the supporting plate 177 from rotating freely. The supporting plate 177 can be held in a predetermined rotational position. A pair of supporting arms 154, 154 are fixed at their root ends to the outer periphery of the supporting plate 177 so as to be spaced apart from each other by a rotational angle of 180 degrees. The distance between the rod 173 and each of the supporting arms 154, 154 is kept constant. Each of the supporting arms 154, 154 extends in the longitudinal direction of the rod 173 (i.e., the moving direction of the piston 153).

Figure 30:
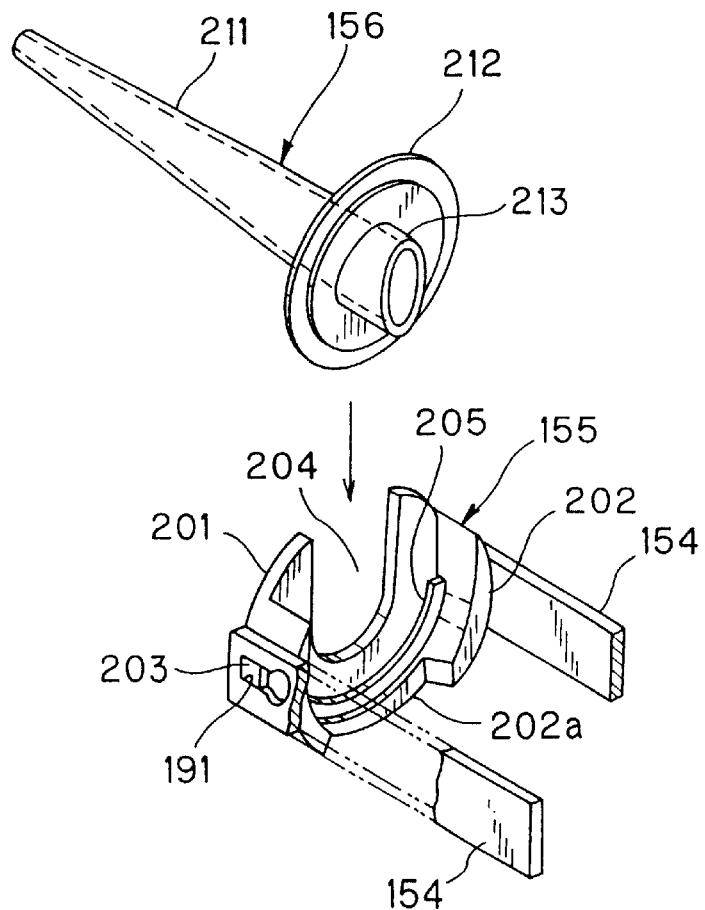
FIG. 30 is an exploded perspective view illustrating a portion of the supporting arms, the nozzle supporting device and a nozzle.
Figure 31:
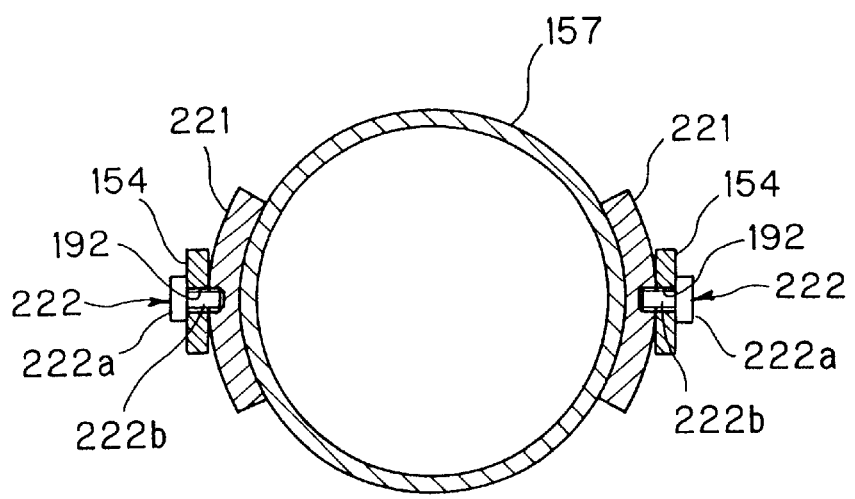
FIG. 31 is a cross-sectional view cut along a line XXXI—XXXI in FIG. 24.

A nozzle-supporting member 155 (i.e., a nozzle-supporting device) is provided at the front ends of the supporting arms 154, 154. The nozzle supporting member 155 is composed of an end-plate portion 201 having a circular shape and of a supporting tubular portion 202, which is formed into a semi-circular tube on the rear surface of the end-plate portion 201, as shown in FIG. 30. The supporting tubular portion 202 is provided on the opposite sides of its outer surface with pivot axis portions 203, 203 each having a square cross-section (Note: The only one pivot axis portion 203 being shown in FIG. 30). The pivot axis portions 203, 203 are inserted into elongated holes 191, 191 (Note: The only one elongated hole 191 is shown in FIG. 30), which are formed at the front ends of the supporting arms 154, 154, respectively. Each of the elongated holes 191, 191 extends in the longitudinal direction of the supporting arms 154, 154. The front end of each of the elongated holes 191, 191 has the same width as that of each of the pivot axis portions 203, 203. The rear end of each of the elongated holes 191, 191 is formed into a circular shape having a diameter, which is substantially identical to the length of the diagonal line of the pivot axis portion 203. As a result, the pivot axis portion 203 is movable in the elongated hole 191 in its longitudinal direction and becomes non-rotatable relative to the supporting arm 154 when being located in the front end of the elongated hole 191, and becomes, on the other hand, rotatable thereto when being located in the rear circular end of the elongated hole 191. When the nozzle supporting member 155 moves forward within a prescribed range, which is determined by the length of the elongated hole 191, it becomes non rotatable relative to the supporting arms 154, 154. When the nozzle-supporting member 155 moves rearward, it becomes, on the contrary, rotatable relative to the supporting arms 154, 154.

A nozzle 156 is detachably mounted on the nozzle-supporting member 155. The nozzle 156 is composed of (i) a nozzle portion 211 tapering off to its tip end, (ii) a flange portion 212, which is formed into a circular shape on the rear end of the nozzle portion 211 and (iii) a tubular insertion portion 213, which is formed on the rear end surface of the flange portion 212. The nozzle portion 211, the flange portion 212 and the tubular insertion portion 213 are coaxial to each other. The nozzle portion 211 and the tubular insertion portion 213 communicate with each other. The end-plate portion 201 of the nozzle supporting member 155 has an insertion groove 204, which opens in the perpendicular direction to the straight line connecting the pair of supporting arms 154, 154 with each other. The supporting tubular portion 202 is provided on its inner peripheral surface with a projection 205 having an arcuate shape. The space defined by the arcuate projection 205 opens in the same direction as the opening direction of the insertion groove 204. The root end of the nozzle portion 211 can be inserted into the insertion groove 204 from the opening end thereof. The flange portion 212 can be inserted into a space between the end-plate portion 201 and the projection 205. The nozzle 156 can detachably be mounted on the nozzle-supporting member 155 in this manner.

When the fluid discharging gun 151 is used exclusively for the cartridge 250, the nozzle 156 may be fixed to or formed integrally with the nozzle-supporting member 155.

The outside diameter of the tubular insertion portion 213 of the nozzle 156 is slightly smaller than the inside diameter of the front end of the discharge port 271 of the cartridge 250, but is substantially identical to or slightly larger than the inside diameter of the rear end of the discharge port 271 thereof. As a result, the tubular insertion portion 213 can be fitted into the rear end of the discharge port 271 of the cartridge 250 in a pressing-in manner. There occurs no leakage of fluid received in the cartridge 250 between the inner peripheral surface of the discharge port 271 and the outer peripheral surface of the tubular insertion portion 213. The fitting of the tubular insertion portion 213 into the discharge port 271 of the cartridge 250 causes the nozzle 156 and the cartridge 250 to be connected with each other under a prescribed frictional resistance. The tubular insertion portion 213 has the rear end with an obliquely cut end. The dimensions of the tubular insertion portion 213 are previously determined so that, when the tubular insertion portion 213 is inserted into the discharge port 271 until the flange portion 212 comes into contact with the reinforcement tube 270, a portion on the obliquely cut end, which is the furthest point from the flange portion 212, projects in the main body 260 of the cartridge 250 through the rear opening end of the discharge port 271 and the other portion on the obliquely cut end, which is the nearest point from the flange portion 212, remains in the discharge port 271. As a result, when the tubular insertion portion 213 is inserted into the discharge port 271 of the cartridge 250, the sealing member 272 is broken by means of the tubular insertion portion 213 so as not to form any cut piece of the sealing member 272, which is separated from the remaining portion thereof. If the sealing member 272 is broken by means the tubular insertion portion 213 to form a circular cut piece of the sealing member 272, which is separated from the remaining portion thereof, the cut piece may enter the nozzle 156 to cause the clogging thereof. In the fourth invention, the sealing member 272 can be broken by cutting it partially along a non-closed cutting line.

A cylinder 157 is disposed between the pair of supporting arms 154, 154 in their middle portions in the longitudinal direction. The cylinder 157 is formed into a tubular shape having a constant diameter over its entire length. The inside diameter of the cylinder 157 is substantially identical with the outside diameter of the front end of the main body 260, i.e., the maximum outside diameter of the main body 260. Consequently, the main body 260 of the cartridge 250 can be inserted into the cylinder 157 from its rear end until the reinforcement tube 270 comes into contact with the end of the cylinder 157.

The cylinder 157 is supported on the pair of supporting arms 154, 154 so as to be movable in the longitudinal direction thereof and swingable. As shown in FIGS. 24 to 29, and 31, a pair of reinforcement members 221, 221 each having a relatively large thickness are provided on the outer peripheral surface of the cylinder 157 so as to be spaced apart from each other by the central angle of 180 degrees. A pair of screw members 222, 222 are screwed to the central portions of the reinforcement members 221, 221, respectively. The central axes of the screw members 222, 222, which are identical to each other, are also identical to the diametrical line of the cylinder 157. The screw member 222 is screwed to the reinforcement members 221 so that the head portion of the screw member 222 is apart from the reinforcement member 221 by the same distance as the thickness of the supporting arm 154. Each of the supporting arms 154, 154 has a support hole 192, which is formed in the central portion of the supporting arm 154 so as to extend in the longitudinal direction thereof. Shank portions 222b of the screw members 222 are inserted into the respective support holes 192 so as to be slidable and rotatable. The cylinder 157 is supported at its central portion on the pair of supporting arms 154, 154 around the axis (i.e., the screw members 222), which is perpendicular to the pair of supporting arms 154, 154.

Figure 25:
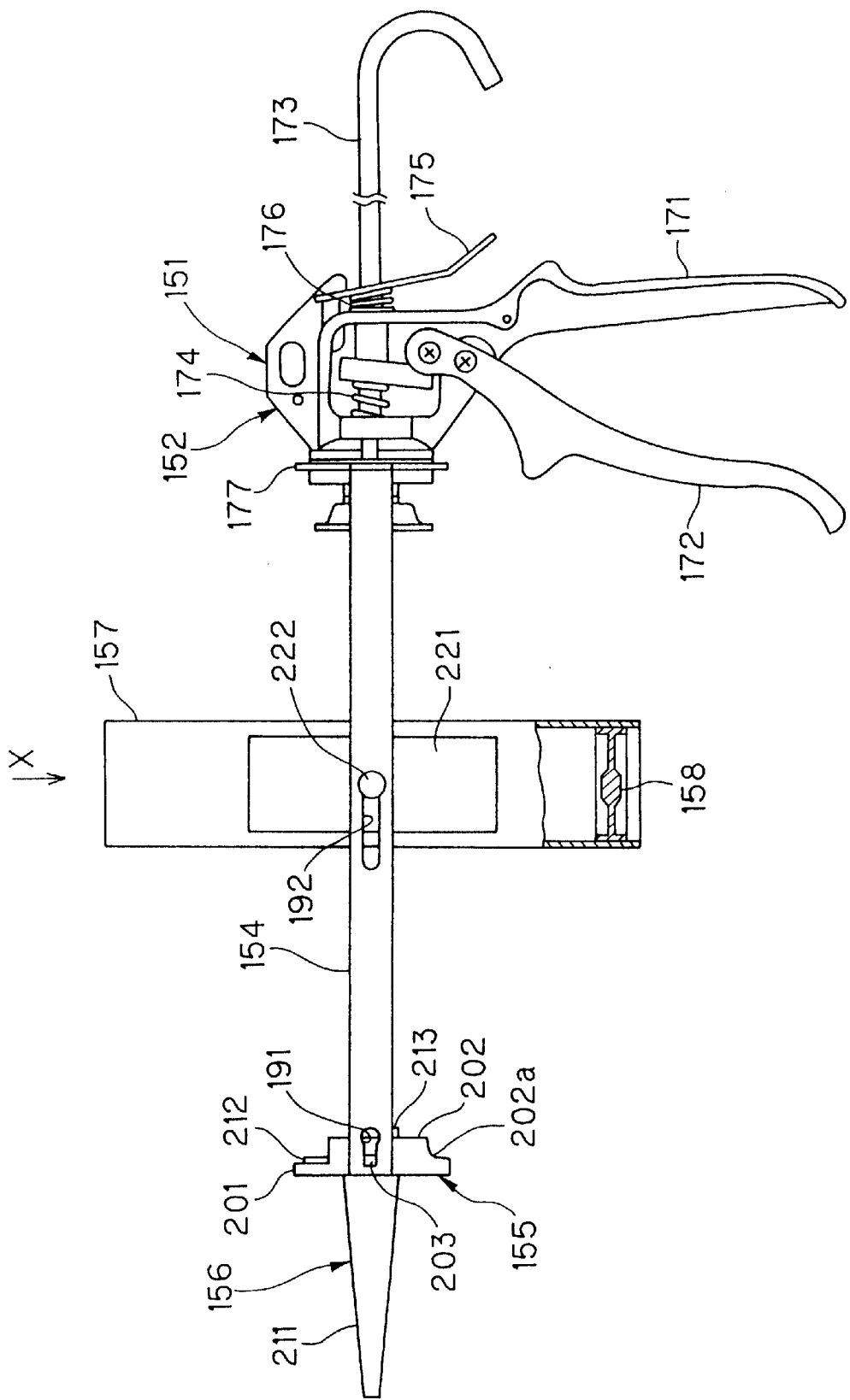
FIG. 25 is a side view illustrating the embodiment of the fluid discharging apparatus of the fourth invention in a state where the cylinder is perpendicular to the supporting arms.
Figure 26:
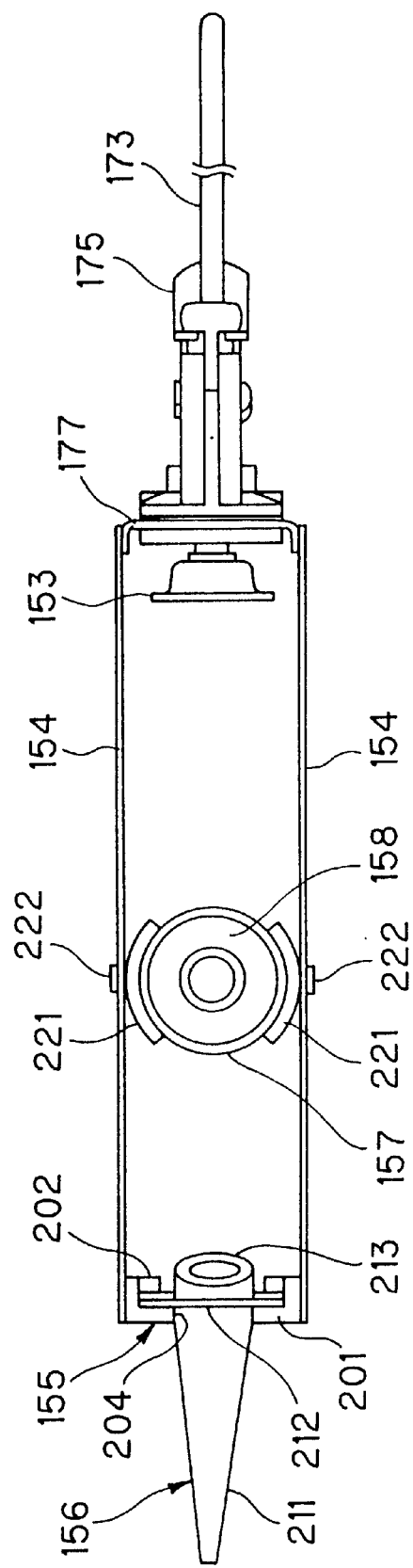
FIG. 26 is a view illustrating the embodiment of the fluid discharging apparatus of the fourth invention, which is viewed in a direction "X" in FIG. 25.
Figure 27:
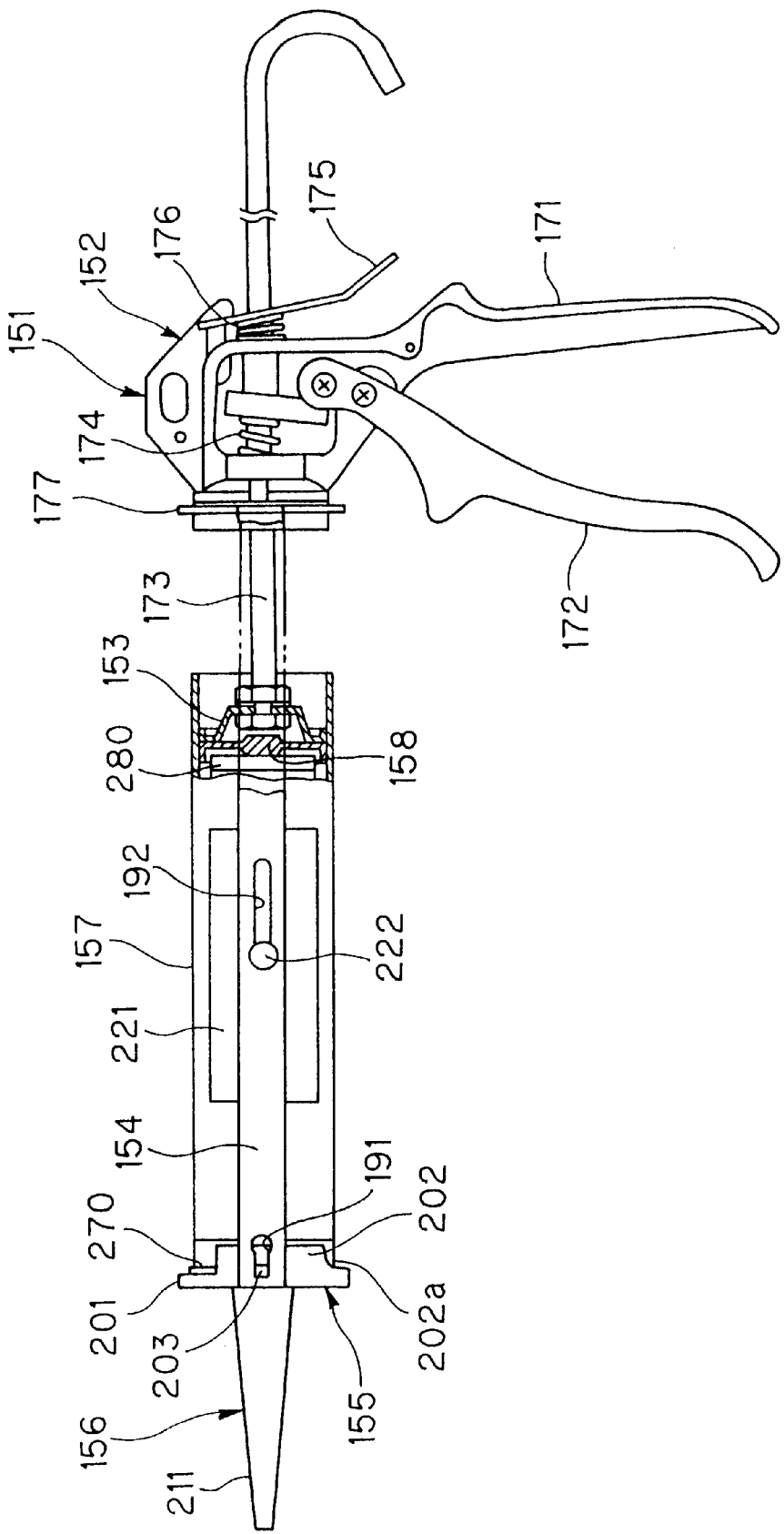
FIG. 27 is a side view illustrating the embodiment of the fluid discharging apparatus of the fourth invention in a state where the fluid is discharged from a fluid dispensing cartridge.

As shown in FIGS. 25 to 27, a pressing body 158 is provided in the inside of the cylinder 157 so as to be slidable therein. The pressing body 158 presses the rear end of the cartridge 250, which is inserted into the cylinder 157, to squeeze the main body 260. The pressing body 158 is pushed to move forward by the piston 153. The pressing body 158 moves to the end of the cylinder 157 when fluid received in the cartridge 250 is used up. In this state, when a new cartridge 250 is inserted into the cylinder 157 from the other end, the bottom 280 of the cartridge 250 comes into contact with the pressing body 158 or a small gap is formed between the bottom 280 of the cartridge 250 and the pressing body 158. Such an insertion operation of the new cartridge 250 can be applied to either a case where the pressing body 158 is moved to the one end of the cylinder 157 or a case where the pressing body 158 is moved to the other end of the cylinder 157. Accordingly, in order to insert the new cartridge 250 into the cylinder 157 after the pressing body 158 is moved to any one of the opposite ends to use up fluid received in the old cartridge, a simple insertion operation of the new cartridge 250 into the cylinder 157 from the other end will suffice and there needs no returning operation of the pressing body 158.

When fluid received in the cartridge 250 with the use of the fluid discharging gun 151 having the above-described structure, the nozzle 156 is previously attached to the nozzle supporting member 155 and the pressing body 158 is previously shifted to the one end of the cylinder 157. Then, the cylinder 157 is moved rearward so that the screw members 222, 222 come into contact with the rear edges of the support holes 192, 192, respectively, and the cylinder 157 is swung so as to be perpendicular to the supporting arms 154, 154, as shown in FIGS. 25 and 26. Any one of the above-mentioned sliding and swinging operations may be carried out prior to the other of them. When the new cartridge 250 is exchanged for the used cartridge 250, the cylinder 157 is however first slid rearward, and then swung, as described later. With respect to the swing operation of the cylinder 157, it is preferable to hold the supporting arms 154, 154 horizontally and the cylinder 157 is swung so that the one end of the cylinder 157, in which the pressing body 158 is fitted, locates in the lower side and the other opening end of the cylinder 157 locates in the upper side.

Then, the cartridge 250 is inserted into the cylinder 157 from its other opening end. Such an insertion operation is carried out so that the rear end of the cartridge 250 comes into contact with the pressing body 158 in the cylinder 157. After the insertion operation of the cartridge 250 is completed so that the reinforcement tube 270 comes into contact with the opposite end of the cylinder 157, the cylinder 157 is swung so as to be in parallel with the supporting arms 154, thus causing the reinforcement tube 270 to face the nozzle supporting member 155. Then, the cylinder 157 is slid forward. The sliding operation of the cylinder 157 may be carried out by holding directly it with a hand and moving it or causing the piston 153 to press forward the pressing body 158. The cylinder 157 is moved forward until the reinforcement tube 270 comes into contact with the projection 205 of the nozzle-supporting member 155. As a result, the tubular insertion portion 213 of the nozzle 156 is fitted into the discharge port 271 of the cartridge 250 to break the sealing member 272. This makes it possible to cause the fluid received in the cartridge 250 to flow into the nozzle 156.

Then, the piston 153 moves forward as shown in FIG. 27 to press the bottom 280 of the cartridge 250 through the pressing body 158 to move the bottom 280 forward. Consequently, the cartridge 250 is squeezed from its rear end into a bellows-shape, with the result that the fluid received in the cartridge 250 is discharged from the nozzle 156.

Figure 28:
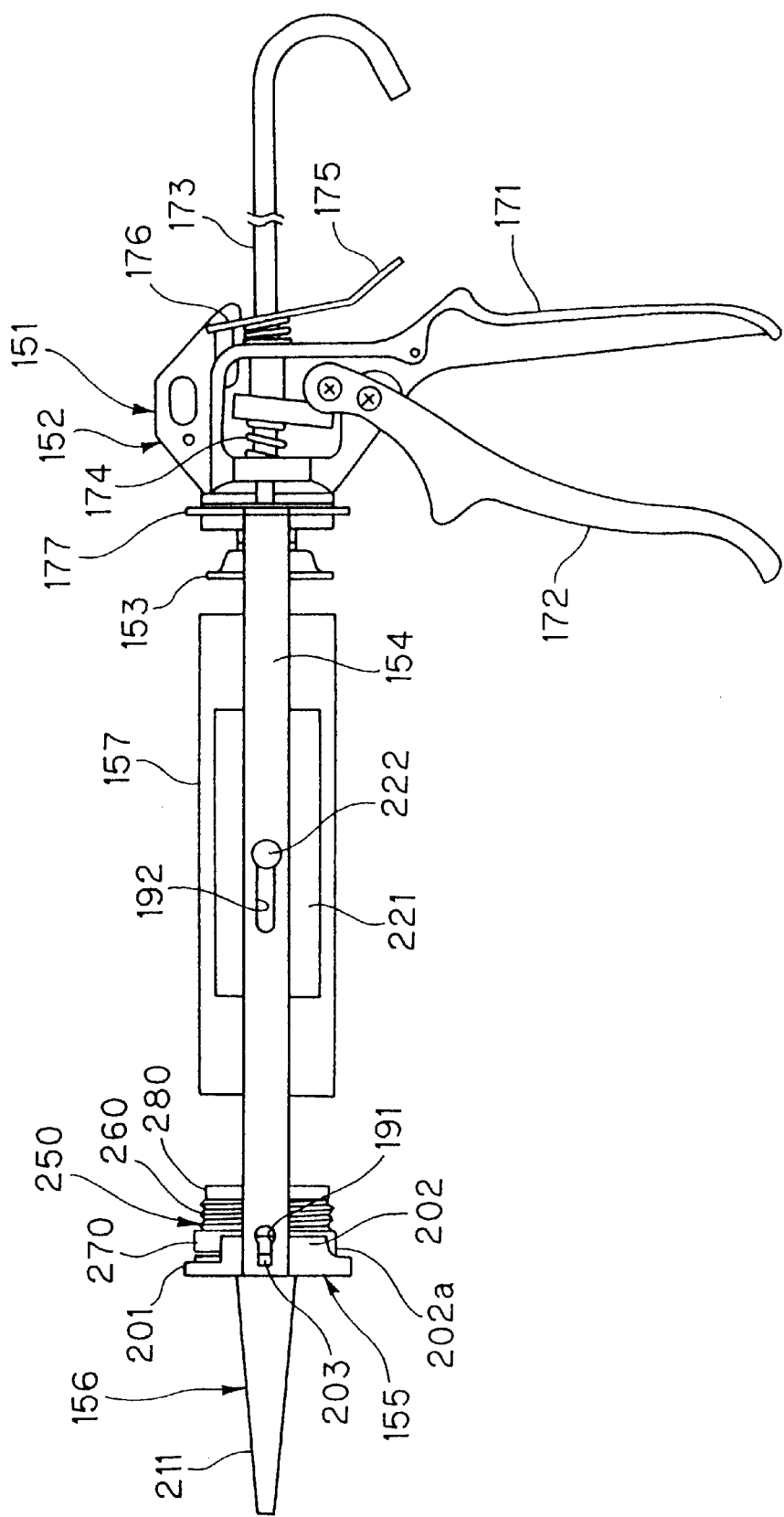
FIG. 28 is a side view illustrating the embodiment of the fluid discharging apparatus of the fourth invention in a state where the cylinder is moved rearward after the fluid received in the cartridge is used up.
Figure 29:
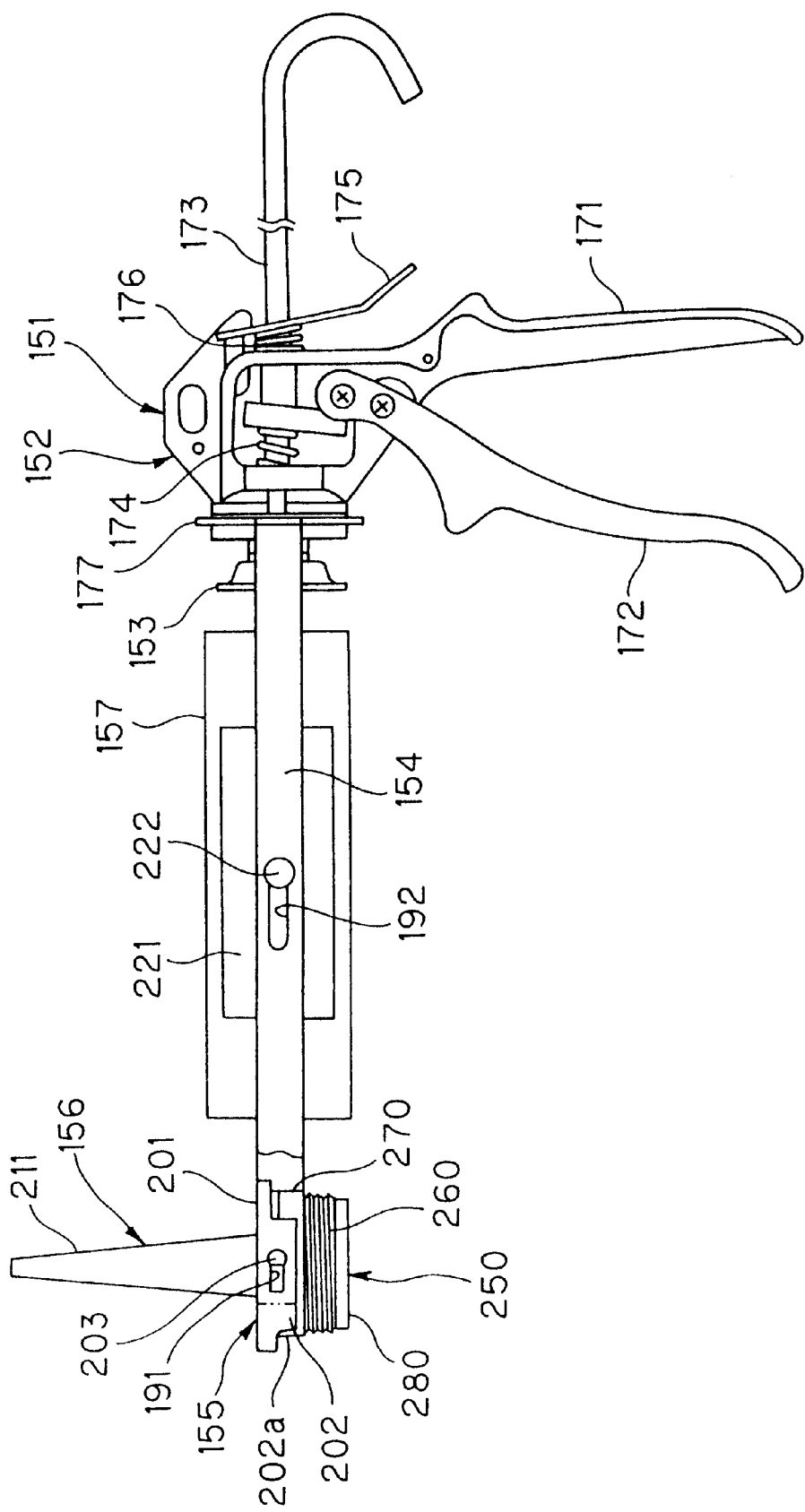
FIG. 29 is a side view illustrating the embodiment of the fluid discharging apparatus of the fourth invention in a state where the cylinder is moved rearward and a nozzle supporting device is swung so that the cartridge, the fluid of which has been used up, can locate below the supporting arms.

After the entire main body 260 of the cartridge 250 is squeezed to use up the fluid in the cartridge 250, the piston 153 moves rearward as shown in FIG. 28 so as to be pulled out from the cylinder 157. Then, the cylinder 157 moves rearward. In this state, the tubular insertion portion 213 of the nozzle 156 is fitted into the discharge port 271 of the squeezed cartridge 250 in the pressing-in manner. The cartridge 250, which is connected to the nozzle supporting member 155 through the nozzle 156, is pulled forward from the cylinder 157 along with the rearward movement of the cylinder 157. Then, The nozzle-supporting member 155 moves rearward and swings by an angle of about 90 degrees as shown in FIG. 29 so that the used cartridge 250 locates below the nozzle-supporting member 155. In this state, the cylinder 157 may be located in parallel with the supporting arms 154, 154. It is however preferable to swing the cylinder 157 so as to locate vertically its longitudinal axis, thus preventing the cylinder 157 from being a hindrance to the removal of the cartridge 250. Then, the cartridge 250 is pulled out from the nozzle 156, while holding the portions of the outer peripheral surface of the reinforcement tube 270 of the cartridge 250 with two fingers, which portions are exposed from an open space of the supporting tubular portion 202 and a cut-out 202a formed on the periphery thereof. In this state, the entire used cartridge 250 locates below the supporting arms 154, 154 so that they do not hinder the hold of the reinforcement tube 270 and the removal of the cartridge 250 from the nozzle 156. It is therefore possible to remove easily the cartridge 250 from the nozzle 156. After the removal of the used cartridge 250, the fluid discharging gun 151 can return to a state as shown in FIG. 25. The insertion of a new cartridge 250 into the cylinder 157 permits to carry out a new discharging operation of fluid.

In the fluid discharging gun 151 of the fourth invention, the cylinder 157 is swingably supported on the supporting arms 154. It is therefore possible to insert the cartridge 250 into the cylinder 157, while holding the main body 152 with a single hand and holding the cartridge 250 with the other single hand. No passing operation of the main body 152, the cylinder 157 and the cartridge 250 from one hand to the other is needed. After the fluid in the cartridge 250 is used up, the main body 152 is held with the single hand and the cylinder 157 is held with the other single hand. After the cylinder 157 moves rearward and the hold of it with the other single hand is released, the cylinder 157 can be held with the single hand. It is therefore unnecessary to place the cylinder 157 in the vicinity of the operator, thus preventing the occurrence of a rolling problem of the cylinder 157.

The fourth invention is not limited only to the above-described embodiments and includes further modified embodiments.

The other kind of cartridge 350 as shown in FIG. 33 may for example be used in replacement of the above-mentioned cartridge 250. The cartridge 350 is composed of a main body 360, a reinforcement tube 370, a nozzle portion 380 and a metallic fastener 390. The main body 360 is the same as the main body 260 described above except that the former has a constant outside diameter over its entire length. The reinforcement tube 370 is provided at the front opening end of the main body 360. The nozzle portion 380 is screwed to the discharge port 371 of the reinforcement tube 370. The metallic fastener 390 closes the rear-opening end of the main body 360. When the above-mentioned cartridge 350 is used for the fluid-discharging gun 151, the front end of the nozzle portion is cut off to open it.

The other kind of fluid discharging gun for discharging fluid received in the above-mentioned cartridge 350 has the same structure as that of the fluid discharging gun 151 described above except for the matters described below. More specifically, the cartridge 350 has the nozzle portion 380, thus making it unnecessary to mount the nozzle 156 on the nozzle-supporting member 155. When the cartridge 350 is used, the nozzle portion 380 is inserted into the insertion groove 204 of the nozzle supporting member 155 and the flange portion 212 is inserted into a space between the reinforcement tube 370 and the nozzle portion 380. The nozzle portion 380 can surely be placed on the nozzle-supporting member 155 and the cartridge 350 can also surely be placed thereon. The fluid discharging gun for the cartridge 350 needs no projection 205. When the projection 205 is formed separately from the nozzle supporting member 155 so as to be detachably fitted thereto, the fluid discharging gun 151 can be used for any one of the cartridges 250, 350.

When fluid is discharged from the cartridge 350 with the use of the fluid discharging gun having the above-described structure, the cartridge 350 is inserted into the cylinder 157, which is in the state as shown in FIG. 25, and the cylinder 157 is then swung so as to be in parallel with the supporting arms 154. The swing operation of the cylinder 157 is carried out, while adjusting its position in the longitudinal direction of the supporting arms 154. The end-plate portion 201 is inserted into the space between the reinforcement tube 370 and the nozzle portion 380 during such a swing operation of the cylinder 157. Then, fluid received in the cartridge 350 is discharged therefrom in the same manner as the cartridge 250. When the fluid in the cartridge 350 is used up, the cylinder 157 is moved rearward to pull the cartridge 350 out of the cylinder 157. Then, the nozzle portion 380 is held by a hand to move upward the cartridge 350 so as to be removed from the nozzle-supporting member 155. In this case, it is unnecessary to swing the nozzle-supporting member 155. The other operations are carried out in the same manner as the cartridge 250.

According to the plastic container of the first invention as described in detail, the formed member is joined to the inner surface of at least one end the main body, which is formed of the plastic laminate film into the tubular shape, by the insert-injection process, thus making it possible to provide a larger effective area of the main body, on which the printing is to be applied, in comparison with the conventional plastic container.

According to the method for manufacturing a plastic container of the first invention as described in detail, the formed member is joined to the inner surface of at least one end the main body, which is formed of the plastic laminate film into the tubular shape, by the insert-injection process, and the inside diameter of the formed member, which locates in the insertion side of the mandrel, is larger than the outside diameter of the formed member, which locates in the opposite side, thus making it possible to pull easily the mandrel from the mold, without being hindered by the formed members.

According to the container for fluid of the second invention as described in detail, it is possible to prevent the laminate film, of which the main body of the container, from being caught between the cylinder of the fluid discharging apparatus and the pressing body. In addition, there is no need to use any tubular body into which the container is to be inserted, and troublesome problems, which occurs when inserting the container into the tubular body, can be avoided. It is also possible to decrease an amount of wastes due to no use of any tubular body. There is no excess material for forming the container and an amount of adhesive as used is decreased. When the container collapses, the laminate can deforms into a bellow-shape having a small size. As a result, when the container is squeezed finally, an amount of fluid remaining in the container can remarkably be decreased.

According to the third invention as described in detail, it is possible to prevent the film, of which the cartridge is formed, from being caught between the pressing body and the tube, for a long period of time.

According to the fluid discharging apparatus of the fourth invention as described in detail, it is possible to solve troublesome problems of carrying out the passing operation of the main body of the gun, the cylinder and the cartridge from one hand to the other or fitting the cylinder to the main body or removing it therefrom, when the exchange operation of the cartridge is carried out. It is also possible to avoid the problem of rolling of the cartridge when exchanging it.

What is claimed is:

1. A plastic container, which comprises:

a main body consisting of a plastic laminate film having a tubular shape;

a large-diameter-formed member joined to an outer surface of an end of said main body by an insert-injection process, said large-diameter-formed member having a tubular shape and an upper opening end having an inside diameter; and a small-diameter-formed member joined to an inner surface of another end of said main body by the insert-injection process, said small-diameter-formed member having an outside diameter, which is smaller than said inside diameter of said large-diameter-formed member, said large-diameter-formed member and said small-diameter-formed member being integrally formed with said main body by an insert-injection process, and being configured to facilitate removal of a mandrel used in said insert-injection process through said upper opening of said large-diameter-formed member.

2. The container as claimed in claim 1, wherein:

said large-diameter-formed member has a grip portion, which is formed on an outer and lower surface of said large-diameter-formed member.

* * * * *